(12) United States Patent
Takeda et al.

(10) Patent No.: US 7,233,921 B2
(45) Date of Patent: Jun. 19, 2007

(54) PRESENTATION OF OPTIMUM PORTFOLIO

(75) Inventors: Shinichi Takeda, Central (HK);
Akihiro Arita, Central (HK)

(73) Assignee: RG Asset Management Co., Ltd., Central (HK)

( * ) Notice: Subject to any disclaimer, the term of this patent is extended or adjusted under 35 U.S.C. 154(b) by 0 days.

(21) Appl. No.: 09/455,916

(22) Filed: Dec. 7, 1999

(65) Prior Publication Data
US 2003/0004845 A1 Jan. 2, 2003

(30) Foreign Application Priority Data
Apr. 2, 1999 (JP) ................... 11-096995

(51) Int. Cl.
G06Q 40/00 (2006.01)
(52) U.S. Cl. .................... 705/36 R; 705/35
(58) Field of Classification Search .................. 705/36, 705/7, 35
See application file for complete search history.

(56) References Cited

U.S. PATENT DOCUMENTS

| | | | | |
|---|---|---|---|---|
| 5,101,353 A | * | 3/1992 | Lupien et al. | 364/408 |
| 5,193,056 A | | 3/1993 | Boes | |
| 5,774,881 A | | 6/1998 | Friend et al. | |
| 5,806,049 A | * | 9/1998 | Petruzzi | 705/36 |
| 5,812,987 A | * | 9/1998 | Luskin et al. | 705/36 |
| 5,812,988 A | * | 9/1998 | Sandretto | 705/36 |
| 5,884,287 A | * | 3/1999 | Edesess | 705/36 |
| 5,930,762 A | * | 7/1999 | Masch | 705/7 |
| 6,003,018 A | | 12/1999 | Michaud et al. | |
| 6,078,904 A | * | 6/2000 | Rebane | 705/36 |
| 6,219,650 B1 | * | 4/2001 | Friend et al. | 705/36 |
| 6,275,814 B1 | * | 8/2001 | Giansante et al. | 705/35 |
| 6,282,520 B1 | * | 8/2001 | Schirripa | 705/36 |
| 6,292,787 B1 | * | 9/2001 | Scott et al. | 705/36 |
| 6,415,268 B1 | * | 7/2002 | Korisch | 705/36 |

FOREIGN PATENT DOCUMENTS

GB 2 298 299 8/1996

OTHER PUBLICATIONS

Masaaki Yamada, "Operations Research for Bond Portfolio Management", Operations Research, May 1, 1997, vol. 42, No. 5, pp. 375-378 (English translation provided).
Shigeki Sakakibara et al. "Securities Investment Theory", The Third Edition, The Security Analysis Association of Japan, Apr. 24, 1998, pp. 136-146 (English translation provided).

* cited by examiner

Primary Examiner—Hani M. Kazimi
(74) Attorney, Agent, or Firm—Buchanan Ingersoll & Rooney PC

(57) ABSTRACT

In a method of providing a portfolio by combining a plurality of financial instruments for a prefixed operating period, there are included a setting step of systematically setting up beforehand a plurality of fluctuation scenarios of market prices related to said instruments, a simulation step of making profit and loss simulation in the future for each one of said plurality of fluctuation scenarios, by using first parameters representing said fluctuation scenarios and second parameters representing characteristics of market, an optimizing step of configuring the optimum portfolio out of the set of portfolios which have been reduced in the preceding step, and a step of making a presentation as the optimum portfolio together with the whole or a part of said fluctuation scenarios.

33 Claims, 16 Drawing Sheets

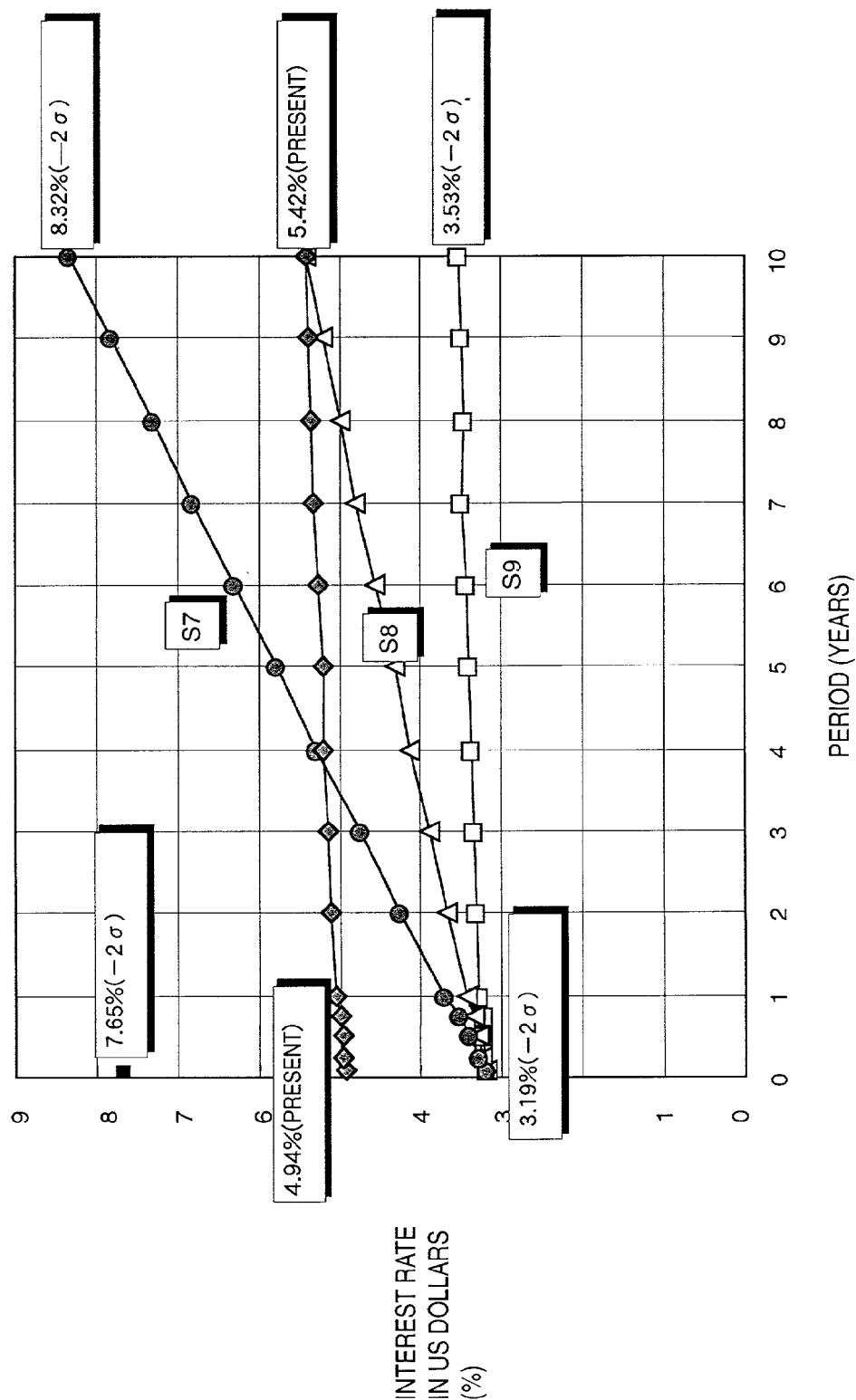

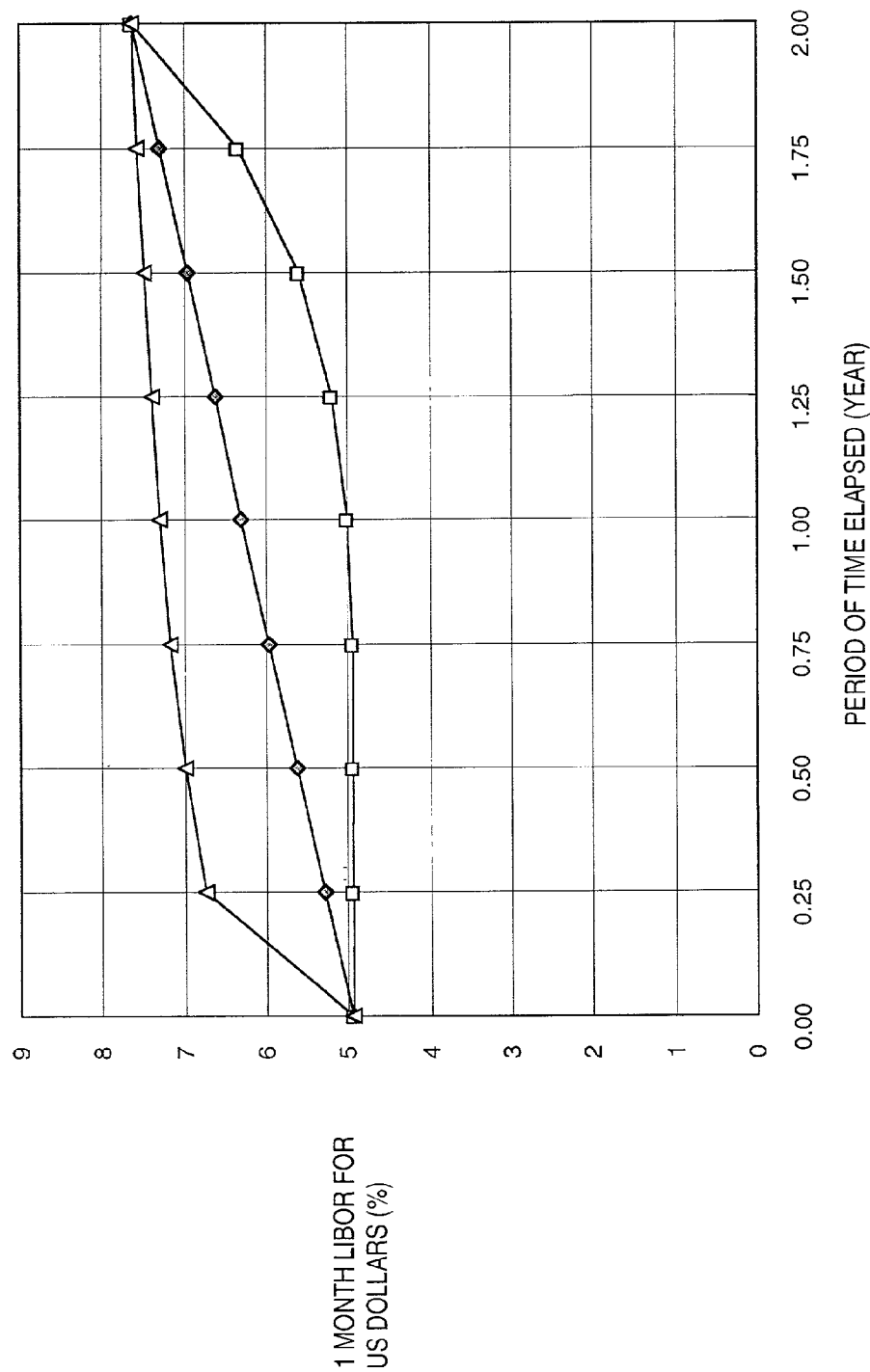

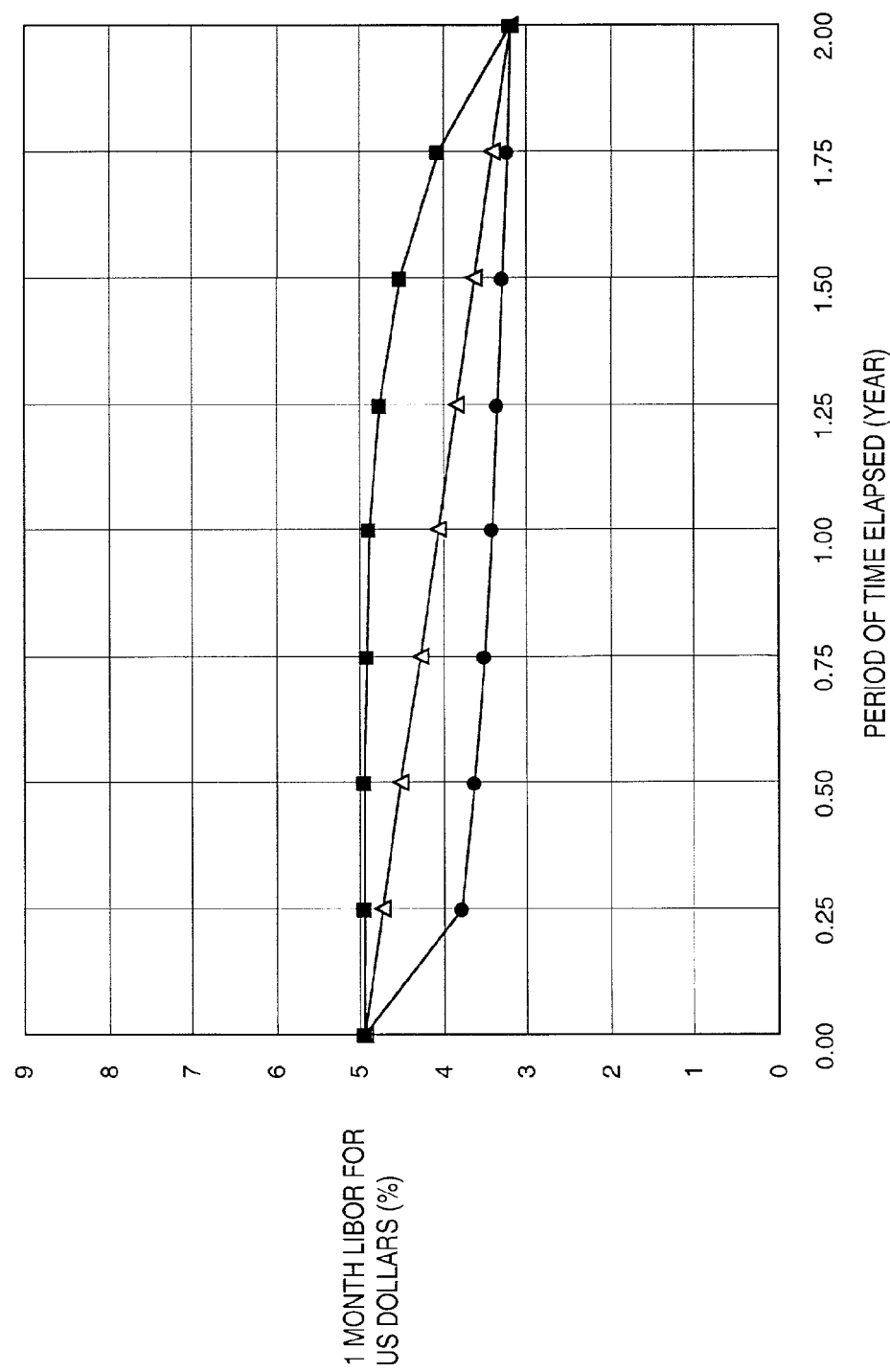

FIG. 8

SWAP POSITION TABLE (INTEREST RATE IN US DOLLARS, DATA: MAR. 19, 1999)

| Start(Yr) | End(Yr) | Rec./Pay | 1Yr | 2Yr | 3Yr | 4Yr | 5Yr | 6Yr | 7Yr | 8Yr | 9Yr | 10Yr |
|---|---|---|---|---|---|---|---|---|---|---|---|---|
| 0.00 | 0.25 | Receive | 0.0 | 0.0 | 0.0 | 0.0 | 0.0 | 0.0 | 0.0 | 0.0 | 0.0 | 0.0 |
| 0.00 | 0.25 | Pay | 0.0 | 0.0 | 0.0 | 0.0 | 0.0 | 0.0 | 0.0 | 0.0 | 0.0 | 0.0 |
| 0.00 | 0.50 | Receive | 2.26824 | 0.0 | 0.0 | 0.0 | 0.0 | 0.0 | 0.0 | 0.0 | 0.0 | 0.0 |
| 0.00 | 0.50 | Pay | 0.0 | 0.0 | 0.0 | 0.0 | 0.0 | 0.0 | 0.0 | 0.0 | 0.0 | 0.0 |
| 0.00 | 0.75 | Receive | 0.0 | 0.0 | 0.0 | 0.0 | 0.0 | 0.0 | 0.0 | 0.0 | 0.0 | 0.0 |
| 0.00 | 0.75 | Pay | 0.0 | 0.0 | 0.0 | 0.0 | 0.0 | 0.0 | 0.0 | 0.0 | 0.0 | 0.0 |
| 0.00 | 1.00 | Receive | 0.0 | 0.0 | 0.0 | 0.0 | 0.0 | 0.0 | 0.0 | 0.0 | 0.0 | 0.23045 |
| 0.00 | 1.00 | Pay | 0.0 | 0.0 | 0.0 | 1.42636 | 0.0 | 0.0 | 0.0 | 0.0 | 0.0 | 0.0 |
| 0.00 | 1.25 | Receive | 0.0 | 0.0 | 0.0 | 0.0 | 0.0 | 0.0 | 0.0 | 0.0 | 0.0 | 0.00779 |
| 0.00 | 1.25 | Pay | 0.0 | 0.0 | 0.0 | 0.0 | 0.0 | 0.0 | 0.0 | 0.0 | 0.0 | 0.0 |
| 0.00 | 1.50 | Receive | 0.0 | 0.0 | 0.0 | 0.0 | 0.0 | 0.0 | 0.0 | 0.0 | 0.0 | 0.13800 |
| 0.00 | 1.50 | Pay | 0.0 | 0.0 | 0.0 | 0.0 | 0.0 | 0.0 | 0.0 | 0.0 | 0.0 | 0.0 |
| 0.00 | 1.75 | Receive | 0.0 | 0.0 | 0.0 | 0.0 | 0.0 | 0.0 | 0.0 | 0.0 | 0.0 | 0.01377 |
| 0.00 | 1.75 | Pay | 0.0 | 0.0 | 0.0 | 0.0 | 0.0 | 0.0 | 0.12880 | 0.0 | 0.0 | 0.0 |
| 0.00 | 2.00 | Receive | 0.0 | 0.0 | 1.25382 | 0.0 | 0.0 | 0.0 | 0.0 | 0.0 | 0.0 | 0.04805 |
| 0.00 | 2.00 | Pay | 0.0 | 0.0 | 0.0 | 0.0 | 0.22575 | 0.0 | 0.39666 | 0.0 | 0.0 | 0.0 |
| 0.25 | 0.50 | Receive | 0.51783 | 0.0 | 0.0 | 0.0 | 0.0 | 0.0 | 0.0 | 0.0 | 0.0 | 0.0 |
| 0.25 | 0.50 | Pay | 0.0 | 0.0 | 0.0 | 0.0 | 0.0 | 0.0 | 0.0 | 0.0 | 0.0 | 0.0 |
| 0.25 | 0.75 | Receive | 5.23916 | 0.0 | 0.0 | 0.0 | 0.0 | 0.0 | 0.0 | 0.0 | 0.0 | 0.0 |
| 0.25 | 0.75 | Pay | 0.0 | 0.0 | 0.0 | 0.0 | 0.0 | 0.0 | 0.0 | 0.0 | 0.0 | 0.0 |
| 0.25 | 1.00 | Receive | 0.0 | 0.0 | 0.0 | 0.0 | 0.0 | 0.0 | 0.0 | 0.0 | 0.0 | 0.0 |
| 0.25 | 1.00 | Pay | 0.0 | 0.0 | 0.0 | 0.0 | 0.0 | 0.0 | 0.0 | 0.0 | 0.0 | 0.0 |
| 0.25 | 1.25 | Receive | 0.0 | 0.0 | 0.0 | 0.0 | 0.0 | 0.0 | 0.0 | 0.0 | 0.0 | 0.0 |
| 0.25 | 1.25 | Pay | 0.0 | 0.0 | 0.0 | 0.0 | 0.0 | 0.0 | 0.01389 | 0.0 | 0.0 | 0.0 |
| 0.25 | 1.50 | Receive | 0.0 | 0.0 | 0.0 | 0.0 | 0.0 | 0.0 | 0.0 | 0.0 | 0.0 | 0.0 |
| 0.25 | 1.50 | Pay | 0.0 | 0.0 | 0.0 | 0.0 | 0.0 | 0.0 | 0.0 | 0.0 | 0.0 | 0.0 |
| 0.25 | 1.75 | Receive | 0.0 | 0.0 | 0.0 | 0.0 | 0.0 | 0.0 | 0.0 | 0.0 | 0.0 | 0.0 |
| 0.25 | 1.75 | Pay | 0.0 | 0.0 | 0.0 | 0.0 | 0.0 | 0.0 | 0.04581 | 0.0 | 0.0 | 0.0 |
| 0.25 | 2.00 | Receive | 0.0 | 0.0 | 0.0 | 0.0 | 0.0 | 0.0 | 0.0 | 0.0 | 0.0 | 0.0 |
| 0.25 | 2.00 | Pay | 0.0 | 0.0 | 0.0 | 0.0 | 0.0 | 0.0 | 0.0 | 0.0 | 0.0 | 0.0 |
| 0.50 | 0.75 | Receive | 0.0 | 0.0 | 0.0 | 0.0 | 0.0 | 0.0 | 0.0 | 0.0 | 0.0 | 0.0 |
| 0.50 | 0.75 | Pay | 0.0 | 0.0 | 0.0 | 0.0 | 0.0 | 0.0 | 0.0 | 0.0 | 0.0 | 0.0 |
| 0.50 | 1.00 | Receive | 0.0 | 0.0 | 0.0 | 0.0 | 0.0 | 0.0 | 0.0 | 0.0 | 0.0 | 0.0 |
| 0.50 | 1.00 | Pay | 0.0 | 0.0 | 0.0 | 0.0 | 0.0 | 0.0 | 0.0 | 0.0 | 0.0 | 0.0 |
| 0.50 | 1.25 | Receive | 0.0 | 0.0 | 0.0 | 0.0 | 0.0 | 0.0 | 0.0 | 0.0 | 0.0 | 0.0 |
| 0.50 | 1.25 | Pay | 0.0 | 0.0 | 0.0 | 0.0 | 0.0 | 0.0 | 0.0 | 0.0 | 0.0 | 0.0 |
| 0.50 | 1.50 | Receive | 0.0 | 0.0 | 0.0 | 0.0 | 0.0 | 0.0 | 0.0 | 0.0 | 0.0 | 0.0 |
| 0.50 | 1.50 | Pay | 0.0 | 0.0 | 0.0 | 0.0 | 0.0 | 0.0 | 0.0 | 0.0 | 0.0 | 0.0 |
| 0.50 | 1.75 | Receive | 0.0 | 0.0 | 0.0 | 0.0 | 0.0 | 0.0 | 0.0 | 0.0 | 0.0 | 0.0 |
| 0.50 | 1.75 | Pay | 0.0 | 0.0 | 0.0 | 0.0 | 0.0 | 0.0 | 0.0 | 0.0 | 0.0 | 0.0 |
| 0.50 | 2.00 | Receive | 0.0 | 0.0 | 0.0 | 0.0 | 0.0 | 0.0 | 0.0 | 0.0 | 0.0 | 0.0 |
| 0.50 | 2.00 | Pay | 0.0 | 0.0 | 0.0 | 0.0 | 0.0 | 0.0 | 0.0 | 0.0 | 0.0 | 0.0 |
| 0.75 | 1.00 | Receive | 0.0 | 0.0 | 0.0 | 0.0 | 0.0 | 0.0 | 0.0 | 0.0 | 0.0 | 0.0 |
| 0.75 | 1.00 | Pay | 0.0 | 0.0 | 0.0 | 0.0 | 0.0 | 0.0 | 0.0 | 0.0 | 0.0 | 0.0 |
| 0.75 | 1.25 | Receive | 0.0 | 0.0 | 0.0 | 0.0 | 0.0 | 0.0 | 0.0 | 0.0 | 0.0 | 0.0 |
| 0.75 | 1.25 | Pay | 0.0 | 0.0 | 0.0 | 0.0 | 0.0 | 0.0 | 0.0 | 0.0 | 0.0 | 0.0 |
| 0.75 | 1.50 | Receive | 0.0 | 0.0 | 0.0 | 0.0 | 0.0 | 0.0 | 0.0 | 0.0 | 0.0 | 0.0 |
| 0.75 | 1.50 | Pay | 0.0 | 0.0 | 0.0 | 0.0 | 0.0 | 0.0 | 0.0 | 0.0 | 0.0 | 0.0 |
| 0.75 | 1.75 | Receive | 0.0 | 0.0 | 0.0 | 0.0 | 0.0 | 0.0 | 0.0 | 0.0 | 0.0 | 0.0 |
| 0.75 | 1.75 | Pay | 0.0 | 0.0 | 0.0 | 0.0 | 0.0 | 0.0 | 0.0 | 0.0 | 0.0 | 0.0 |
| 0.75 | 2.00 | Receive | 0.14681 | 0.0 | 0.0 | 0.0 | 0.0 | 0.0 | 0.0 | 0.0 | 0.0 | 0.0 |
| 0.75 | 2.00 | Pay | 0.0 | 0.0 | 0.0 | 0.0 | 0.0 | 0.0 | 0.0 | 0.0 | 0.0 | 0.0 |
| 1.00 | 1.25 | Receive | 0.0 | 0.0 | 0.0 | 0.0 | 0.0 | 0.0 | 0.0 | 0.0 | 0.0 | 0.0 |
| 1.00 | 1.25 | Pay | 0.0 | 0.0 | 0.0 | 0.0 | 0.0 | 0.0 | 0.0 | 0.0 | 0.0 | 0.0 |
| 1.00 | 1.50 | Receive | 0.0 | 0.0 | 0.0 | 0.0 | 0.0 | 0.0 | 0.0 | 0.0 | 0.0 | 0.0 |
| 1.00 | 1.50 | Pay | 0.0 | 0.0 | 0.0 | 0.0 | 0.0 | 0.0 | 0.0 | 0.0 | 0.0 | 0.0 |
| 1.00 | 1.75 | Receive | 0.0 | 0.0 | 0.0 | 0.0 | 0.0 | 0.0 | 0.0 | 0.0 | 0.0 | 0.0 |
| 1.00 | 1.75 | Pay | 0.0 | 0.0 | 0.0 | 0.0 | 0.0 | 0.0 | 0.0 | 0.0 | 0.0 | 0.0 |
| 1.00 | 2.00 | Receive | 0.0 | 0.0 | 0.0 | 0.0 | 0.0 | 0.0 | 0.0 | 0.0 | 0.0 | 0.0 |
| 1.00 | 2.00 | Pay | 0.0 | 0.0 | 0.0 | 0.0 | 0.0 | 0.0 | 0.0 | 0.0 | 0.0 | 0.0 |
| 1.25 | 1.50 | Receive | 0.0 | 0.0 | 0.0 | 0.0 | 0.0 | 0.0 | 0.0 | 0.0 | 0.0 | 0.0 |
| 1.25 | 1.50 | Pay | 0.0 | 0.0 | 0.0 | 0.0 | 0.0 | 0.0 | 0.0 | 0.0 | 0.0 | 0.0 |
| 1.25 | 1.75 | Receive | 0.0 | 0.0 | 0.0 | 0.0 | 0.0 | 0.0 | 0.0 | 0.0 | 0.0 | 0.0 |
| 1.25 | 1.75 | Pay | 0.0 | 0.0 | 0.0 | 0.0 | 0.0 | 0.0 | 0.04113 | 0.0 | 0.0 | 0.0 |
| 1.25 | 2.00 | Receive | 0.0 | 0.0 | 0.0 | 0.0 | 0.0 | 0.0 | 0.0 | 0.0 | 0.0 | 0.13608 |
| 1.25 | 2.00 | Pay | 0.0 | 0.0 | 0.0 | 0.0 | 0.0 | 0.0 | 0.0 | 0.0 | 0.0 | 0.0 |
| 1.50 | 1.75 | Receive | 0.0 | 0.0 | 0.0 | 0.0 | 0.0 | 0.0 | 0.0 | 0.0 | 0.0 | 0.0 |
| 1.50 | 1.75 | Pay | 0.0 | 0.0 | 0.0 | 0.0 | 0.0 | 0.0 | 0.0 | 0.0 | 0.0 | 0.0 |
| 1.50 | 2.00 | Receive | 0.0 | 0.0 | 0.0 | 0.0 | 0.0 | 0.0 | 0.0 | 0.0 | 0.0 | 0.0 |
| 1.50 | 2.00 | Pay | 0.0 | 0.0 | 0.0 | 0.0 | 0.0 | 0.0 | 0.0 | 0.0 | 0.0 | 0.0 |
| 1.75 | 2.00 | Receive | 0.0 | 0.0 | 0.0 | 0.0 | 0.0 | 0.0 | 0.0 | 0.0 | 0.0 | 0.0 |
| 1.75 | 2.00 | Pay | 0.0 | 0.0 | 0.0 | 0.0 | 0.0 | 0.0 | 0.0 | 0.0 | 0.0 | 0.0 |

FIG. 10

| AUSTRALIAN DOLLARS | US DOLLARS | EURO | JAPANESE YEN | U.K. POUND | SWISS FRANC |

404

GRAPH 3 : DISTRIBUTION OF VARIATION OF INTEREST RATE DURING 2 YEARS AS OBSERVED IN THE PAST DATA
1 MONTH LIBOR FOR US DOLLARS (OCT. 4, '93 - NOV. 13, '98)

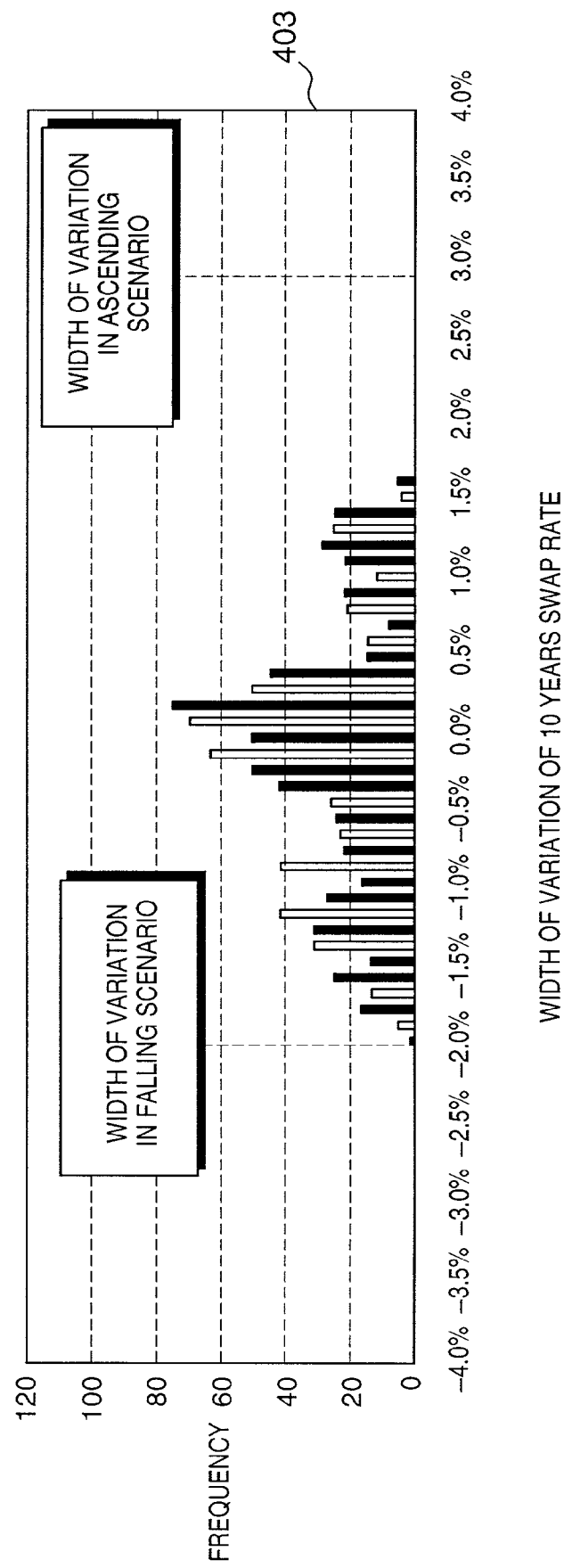

FIG. 15

<EXPECTED EARNINGS (YEN BASE)>

| | INTEREST RATE SCENARIO | 1 MONTH LIBOR WIDTH OF VARIATION (2σ) | 10 YEARS SWAP RATE WIDTH OF VARIATION (2σ) | EXPECTED EARNINGS BY SCENARIOS ||||||
|---|---|---|---|---|---|---|---|---|---|
| | | | | (A) LARGELY FLUCTUATED IN THE FIRST HALF PERIOD || (B) LARGELY FLUCTUATED IN THE LATTER HALF PERIOD || (C) VARIED LINEARLY ||
| | | | | CAPITAL GAIN | YIELD DURING THE PERIOD | CAPITAL GAIN | YIELD DURING THE PERIOD | CAPITAL GAIN | YIELD DURING THE PERIOD |
| S1 ASCENDING | PARALLEL SHIFT (ASCENDING) | +2.74188% | +2.98946% | 1.44% | ¥6mL+121 | 1.57% | ¥6mL+127 | 1.17% | ¥6mL+108 |
| S2 | FLATTENING (ASCENDING) | +2.74188% | 0.00000% | 1.27% | ¥6mL+112 | 1.62% | ¥6mL+130 | 1.27% | ¥6mL+112 |
| S3 | FLATTENING (REVOLVING) | +2.74188% | -1.95384% | 1.15% | ¥6mL+106 | 1.54% | ¥6mL+126 | 1.15% | ¥6mL+111 |
| S4 | STEEPENING (ASCENDING) | 0.00000% | +2.98946% | 1.53% | ¥6mL+125 | 1.35% | ¥6mL+116 | 1.31% | ¥6mL+114 |
| S5 | UNCHANGED (PRESENT STATUS) | 0.00000% | 0.00000% | 1.30% | ¥6mL+114 | 1.30% | ¥6mL+114 | 1.30% | ¥6mL+114 |
| S6 FALLING | FLATTENING (FALLING) | 0.00000% | -1.95384% | 1.14% | ¥6mL+106 | 1.14% | ¥6mL+106 | 1.20% | ¥6mL+109 |
| S7 | STEEPENING (REVOLVING) | -1.77081% | +2.98946% | 1.62% | ¥6mL+129 | 1.44% | ¥6mL+121 | 1.48% | ¥6mL+122 |
| S8 | STEEPENING (REVOLVING) | -1.77081% | 0.00000% | 1.35% | ¥6mL+116 | 1.31% | ¥6mL+114 | 1.39% | ¥6mL+118 |
| S9 | PARALLEL SHIFT (FALLING) | -1.77081% | -1.95384% | 1.16% | ¥6mL+107 | 1.10% | ¥6mL+104 | 1.23% | ¥6mL+110 |

PRESENTATION OF OPTIMUM PORTFOLIO

BACKGROUND OF THE INVENTION

The present invention relates to a method of presenting a portfolio and its apparatus as well as its system, and particularly to a method of optimizing the portfolio.

As a method of optimizing a portfolio, a method utilizing an efficient frontier based on the "portfolio selection" has been known. An efficient frontier is a set of portfolios obtained by providing various levels of expected earnings as given conditions and minimizing the corresponding variance or volatility. For convenience such approach will be called hereunder as "method of minimizing volatility".

In the portfolio selection mentioned above, the volatility is representing the concept of risk. However, from a standpoint of an investor, the fact that return is falling short of a target level is the very risk. A downside risk model, which is based on such a standpoint and is taking up the statistic of the Lower Partial Moment (LPM) or the like as a risk, is known. The method of optimizing the portfolio based on the downside risk model will be called hereunder for convenience as "method of optimizing downside risk".

In the method of volatility minimizing method and the downside risk minimizing method mentioned above, although they differ from each other in how the risk is grasped, they are same in evaluating the portfolio with two parameters of expected return and risk. Whichever approach may be employed, when a portfolio is configured with assets which are subject to price fluctuation in the market being taken in, it will be necessary to make a prediction of future market prices. However, unless the precision in the prediction of market fluctuations is very high, it will be questionable whether the optimum portfolio obtainable meets the expectation of an investor or not.

Therefore, when such a method of optimizing the portfolio is applied particularly to an investment of a short time period such as a few years, after a certain portfolio is selected out of the optimum portfolios obtained by such a method, the selected portfolio is operated principally by applying the buy and hold strategy, and then the asset universe is regulated or replaced in every fixed time period (for example, semiannually or annually). That is, a variance in profit status is covered by taking the change in the market during the operating period into the portfolio in every fixed time period.

The continuous application of the optimization in every fixed time period does not always realizes an optimization throughout the entire investment period, in general. In other words, there could be a discordance between the period of operation and a conventional optimization method, particularly in an operation for a short time period such as a few years.

The inventors of the present invention believe that an introduction of a new optimization method which maximizes the excess return at the time when the investment is completed is necessary, while countering the downside risks.

SUMMARY OF THE INVENTION

Therefore, the object of the present invention lies in introducing a method of carrying out the optimization of a portfolio by employing a certain mini-max strategy, which is different from conventional methods.

In the present invention, a method of configuring at an initial period of operation a portfolio which takes into consideration the timing of buying and selling or of concluding and canceling contracts for financial instruments to be incorporated, which is different from conventional methods.

And the method of the present invention to provide a portfolio which combines a plurality of financial instruments for a prefixed period of operation, to attain the above mentioned object, is characterized by comprising:

a setting step of systematically setting beforehand plural fluctuation scenarios of market prices of said financial instruments;

a simulation step of reducing a set of portfolios to be sought by making profit and loss simulation in the future against each one of said plural fluctuation scenarios using a first parameter representing said fluctuation scenarios and a second parameter representing the characteristics of market;

a portfolio optimizing step to configure the optimum portfolio from the set of portfolios which have been reduced in the preceding step; and a providing step to provide the optimum portfolio together with the results of profit and loss simulation on the whole fluctuation scenarios mentioned above or a part of said scenarios. The future profit and loss can be actually calculated by considering such scenarios as mentioned above, thus a set of portfolios, which has such profit and loss profiles as desirable for an investor, can be taken out.

For example, if it is desired to counter downside risks, a set of only such portfolios that do not fall short of a target profit is secured, and an optimum portfolio may be selected out of such set.

According to claim 2, which is a preferable aspect of the present invention, the above mentioned plural fluctuation scenarios take into consideration the timing of buying and selling, timing of concluding contract and timing of canceling contract for financial instruments to be operated by the method of the invention and preset the same. The precision of simulation is enhanced by taking these elements into consideration.

According to claim 3, which is a preferable aspect of the present invention, results of only such simulation as having profit and loss profiles which are at the same or higher level to/than the characteristic value which was set beforehand are provided. Thus, a portfolio intended by a user may be obtained.

The optimum portfolio that has been configured by a user will be easy and convenient to use. Therefore, claim 4, which is a preferable aspect of the present invention is characterized by further comprising steps in which a user establishes a prescribed threshold conditions in the above mentioned providing step; and a step of providing the profit and loss simulations that meet the above mentioned threshold conditions out of the results of profit and loss simulations made.

Claim 5, which is a preferable aspect of the present invention, is characterized by that the above mentioned fluctuation scenarios take into consideration the fluctuation of market prices such as interest rate, stock prices, commodity prices and/or exchange rate, etc.

Claim 6, which is a preferable aspect of the present invention, is characterized by that said setting step has a step of configuring individual fluctuation scenarios as a plurality of basic fluctuation scenarios (for example, FIG. 3 to FIG. 5 to be described later) which constitute the basis of market prices at a time when the operating period elapses; and a plurality of fluctuation process scenarios (for example, FIG. 6 to FIG. 7 to be described later) of market prices during the operating period;

based on past market price data;

and said simulation step computes the profit and loss, utilizing all combinations of said plurality of basic fluctuation scenarios and said plurality of fluctuation process scenarios as a space of the market prices in the future.

Claim 7, which is a preferable aspect of the present invention, is characterized by that said setting step has a step of fragmenting the timing of selling and buying, the timing of concluding contracts, the timing of canceling contracts in the future of the financing instruments to be operated according to the characteristics of such financial instruments by dividing the operating period with a prescribed intervals;

and said simulation step has:

a step of computing the profit and loss for each one of all fluctuation scenarios for all possible operating periods which have been fragmented in the above mentioned step.

Claim 8, which is a preferable aspect of the present invention, is characterized by that said setting step has a step of giving a first constraint set which is a constraint set for effecting control over the profit and loss profiles of expectable portfolio and employs a function with market prices used as variables and a second constraint set which relates to profit and loss that can be earned/sustained; and said simulation step applies a subset of said first and second constraint sets to each one of said fragmented operating periods respectively.

Claim 9, which is a preferable aspect of the present invention, is characterized by that said simulation step applies a linear programming as a method to obtain such portfolio that will have a certain value or higher and at the same time can have the largest expectation value, in every one of the fluctuation scenarios.

Claim 10, which is a preferable aspect of the present invention, is characterized by that said optimizing step introduces such portfolio that incorporates the portfolio of each scenario as asset universe, as a method of summarizing the portfolios obtained for each one of the fluctuation scenarios into a final portfolio, and the efficient frontier is obtained by minimizing the volatility of such introduced portfolio.

Claim 11, which is a preferable aspect of the present invention, is characterized by that said setting step has a step of fragmenting the timing of selling and buying, the timing of concluding contracts, the timing of canceling contracts in the future of the financing instruments to be operated according to the characteristics of such financial instruments by dividing the operating period with a prescribed intervals; and a step of having sample paths generated under a supposition of normal distribution of multiple variate using the past data of the market, relative to the variance-covariance matrix for portfolios, which are necessary for obtaining an efficient frontier and correspond to each fluctuation scenario, then obtaining average, variance, correlation coefficient for every one of the fragmented periods mentioned above, thus obtaining beforehand said variance-covariance matrix by using such data as mentioned and memorizing them as data base.

Claim 12, which is a preferable aspect of the present invention, is characterized by that said providing step displays the simulation results in a prescribed display device in a manner allowing an evaluation.

Claim 13, which is a preferable aspect of the present invention, is characterized by that said providing step transfers the simulation results to a prescribed program through a program interface.

Claim 14, which is a preferable aspect of the present invention, is characterized by that said providing step comprises a step to display at least one out of a time table of portfolios during the operating period which is established at the beginning of the period, said basic scenario, path scenarios, histograms of width of variation of the financial instruments assumed in the scenarios and their past data, and a table of expected earnings for each one of individual scenarios.

The above mentioned object of the present invention can be achieved by providing program memory media.

In the claim 15, which is a preferable aspect of the present invention, the program memory media to memorize computer programs which can be read by a computer memorizes a first program code for carrying out on a computer the setting steps described in claims 1 to 14.

In the claim 16, which is a preferable aspect of the present invention, the program memory media to memorize computer programs which can be read by a computer memorizes a second program code for carrying out on a computer the simulation steps described in claims 1 to 14.

In the claim 17, which is a preferable aspect of the present invention, the program memory media to memorize computer program which can be read by a computer memorizes a second program code for carrying out on a computer the simulation steps described in claims 1 to 14, and a third program code for carrying out on a computer the providing steps described in the same claims.

In the claim 18, which is a preferable aspect of the present invention, the program memory media to memorize computer program which can be read by a computer memorizes a first program code for carrying out on a computer the setting steps described in the claims 1 to 14, a second program code for carrying out on a computer the simulation steps described in the same claims, and a third program code for carrying out on a computer the providing steps described in the same claims.

The present invention may be also achieved by the apparatus which realizes the above mentioned methods, for example by such arrangement as indicated in claim 19.

BRIEF DESCRIPTION OF THE DRAWINGS

FIG. 5 is a diagram to explain an example of the basic scenarios of the embodiment.

FIG. 6 is a diagram to explain an example of interest path scenarios in the embodiment.

FIG. 7 is a diagram to explain an example of interest path scenarios in the embodiment.

FIG. 8 is table showing the time table of portfolio during an operating period in the embodiment by swap positions.

FIG. 10 is a diagram to explain dialogue designating a currency to obtain the optimized portfolio.

FIG. 14 is a diagram to explain an example of frequency distribution of interest rate fluctuation.

FIG. 15 is table to show an indication example of expected earnings for each scenario.

DETAILED DESCRIPTION OF THE PREFERRED EMBODIMENTS

The present invention introduces, instead of forecasting market prices by points, a scenario configuring method, LMI (Latticing Method of Interest rate curve by historical volatility), which sets a space of price fluctuation, for example for market fluctuation of interest rate. By this, profit and loss may be computed for every price fluctuation within such space, and expected returns in the future can be grasped quantitatively.

As an introduction of the LMI makes it possible to compute expected returns under various market price fluctuation scenarios, a set of such portfolios that will not go down below the given lower limit of profit and loss under any scenarios can be obtained in the embodiment by firstly using a linear programming method. Secondly, the optimum solution shall be computed using a quadratic programming for optimizing the expected returns in said set of portfolios.

A portfolio optimizing method by the two steps optimization mentioned above in this embodiment shall be called MPMS (combining Multiple optimal Portfolios in Multiple Scenarios).

Figure 1:
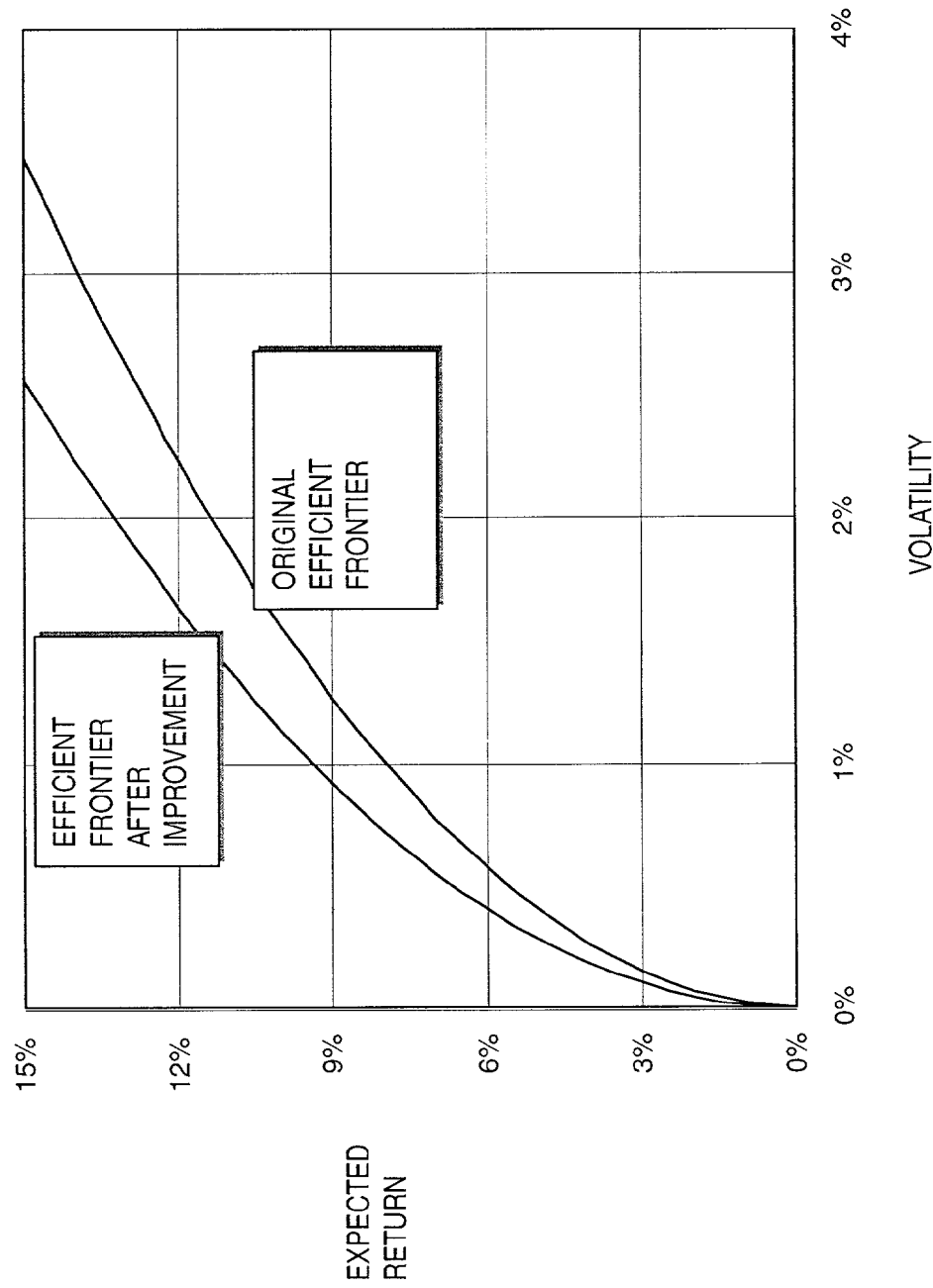
FIG. 1 is a diagram illustrating the manner of an efficient frontier being improved as a result of applying a preferable embodiment.

This embodiment is based on the discernment that an improvement of efficient frontier as shown in FIG. 1 may be expected, if assets having some of the properties listed below can be supposed to exist by fragmenting the holding period of asset universe:

1) Such assets exist earnings from which have different signs, and the volatilities of which are about equal at the same time;

2) Such assets exist volatility of which is low, even if their expected earnings are about equal;

3) Such assets exist volatility of which is about equal, even if their expected earnings are high.

For obtaining an efficient frontier, it is necessary to give expected earnings for the asset universe. However, it is difficult to precisely forecast the fluctuation of future market prices during the operation period all the time. Therefore this embodiment employs an approach of introducing a fluctuation scenarios of market prices and making a space setting of market price fluctuation, then reducing down to a set of portfolios having good earning characteristics within the entire space thus set, and seeking the optimum portfolio out of thus reduced set.

For a market price fluctuation scenario, two kinds of scenarios are configured from past market prices data, that is, a plurality of variation scenarios (basic scenarios) of market prices at a time the operating period elapses and a plurality of variation scenarios (path scenarios) of market prices during operating period. In this embodiment, a combination of the both kinds of scenarios is used as a market price fluctuation scenario, and a set of the all market price fluctuation scenarios is set as a space of market price fluctuation during the operating period. While how a scenario space is systematically set, in a more concrete sense, is a matter which should be decided according to the characteristics of the financial instruments to be incorporated into the portfolio, a setting of scenario needs to be made by a systematic method for eliminating arbitrariness to the lowest possible level.

The portfolio to be obtained finally is obtained by two stages of optimization as shown below.

In a first stage, such portfolio that will make a certain level of earnings or higher and at the same time can have the maximum expected earnings for every scenario is sought by using a linear programming method. Here, the condition of a certain level of earnings or higher for every scenario is important, and by this, a possibility of suffering a large loss by the portfolio to be sought is reduced relative to every fluctuation of market prices, within such scope that is assumed in the scenarios.

As a second stage, such portfolio, that has the optimum portfolio for each scenario which was obtained in the first stage as the asset universe, is introduced, and the problem of minimizing the volatility of this portfolio is solved by a quadratic programming method, thus obtaining an efficient frontier. At that time, sample paths are made to be generated under a supposition of normal distribution of multiple variate using the past data of the market, then the average, variance, correlation coefficient for every one of the fragmented asset universe are obtained, then the variance-covariance matrix for portfolio, which is necessary for computation of optimization and corresponds to each scenario, are obtained separately by using the average, variance, correlation coefficient mentioned above.

First Embodiment

Figure 2:
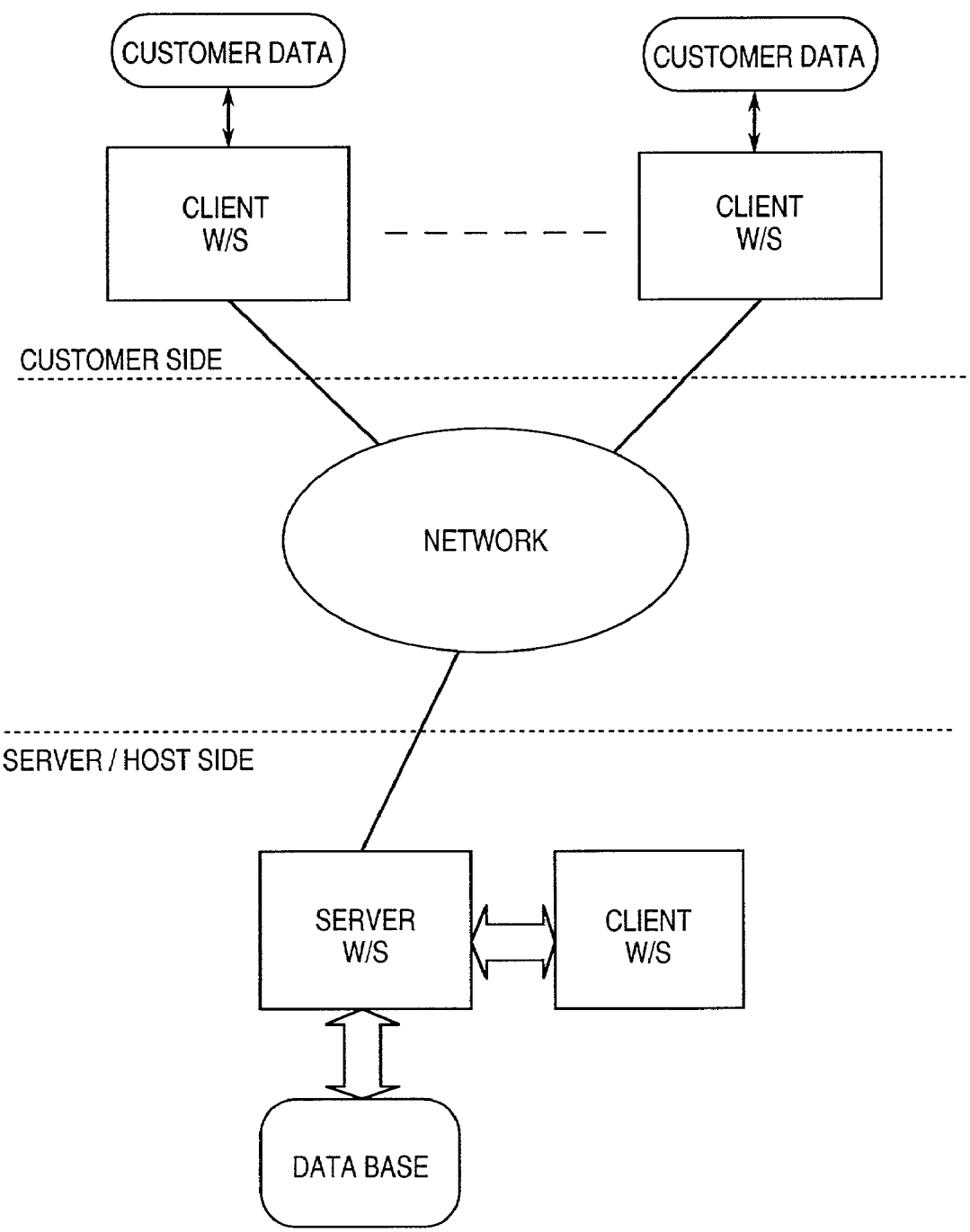
FIG. 2 is a diagram illustrating a system configuration of the embodiment.

FIG. 2 shows a system configuration of First Example of the present invention, which has configured the above mentioned embodiment in a further concrete form. That is, a computer system for computing the optimum portfolio and for presenting it to a customer in the First Example consists principally of a known type of workstations or high speed personal computers.

As will be described later, for obtaining the optimum portfolio by a simulation, various kinds of data base are necessary beforehand, and an application program, which makes a simulation based on such data base for presenting to a user, is necessary.

In FIG. 2, a plurality of workstations are connected to the network. The server workstation has a data base application program for forming said data base installed therein. Data base is connected to this server workstation, and the data base prepared by said data base application program is memorized.

The client workstation has a simulation application program which makes simulation of the optimized portfolio and a program which presents the simulation results to a user installed therein. At the server side, the server workstation and the client workstation are connected by a high speed path.

The workstation at the host side is connected to a plurality of client workstations for customers through a network (for example, Internet) for providing services in response to requests from a plurality of workstations of clients. A workstation at the customer side is satisfied principally by having a providing application program installed therein. At the customer side, the providing application program should be able to have the user data, which are entered by individual customers (data for optimization guide incidental to that particular user), introduced therein, and make an output display of the optimum portfolio, etc. to satisfy its mission. For a customer who desires a high speed processing, a simulation application program is further installed. The reason for not installing data base at the customer side is that the data base is most important in the embodiment as will be described later, and such important data should be prevented from diffusion. For a customer who is known as exercising strict protection and preservation of data, a data base may naturally be installed.

In each workstation, a simulation program and provided program are formed into a module, and whenever what fluctuation scenarios are to be used is decided, the parameters of such scenarios will be sent to program modules which need such scenario parameters through a known program interface.

Thus, the system of this embodiment satisfies the security, expandability, and maintainability in a compatible manner.

Now, explanations shall be made on an optimization of a portfolio having an interest (rate) swap as its constituent, based on the premises of a system which has an application program for setting data base, a simulation application program, and a providing application program of portfolios are installed into a workstation.

<Step 0: Definition of Fragmentation of Swap>

An operating period is expressed by T, and periods of M kinds of interest rate swap are expressed by $m_j$ (j=1 ... M), and the minimum unit period of T is expressed by $\tau$ (here, T and $m_j$ shall be divisible by $\tau$). Then, for M kinds of interest rate swap, a number $n_j$ (j=1 ... M) of timings when a interest rate swap is initiated and cancelled, where:

$$n_j = \begin{cases} (m_j/\tau)+1 & \text{if } m_j < T \\ (T/\tau)+1 & \text{else} \end{cases} \quad [EQ\ 1]$$

are set, and the interest rate swap is fragmented. However, when $m_j<T$ holds, rolling shall be made with the LIBOR (London interbank offered rate) after maturity of the swap. Further, taking the two ways of swaps with receiving fixed rate of interest and paying fixed rate of interest into consideration, the swaps which can be constituents of the portfolio are hereby defined in the N number prescribed by the following equation:

$$N = \sum_{j=1}^{M} {}_{n_j}C_2 \cdot 2 \quad [EQ\ 2]$$

Explanations shall be made with the following examples.

For example, cases of interest rate swaps for 1 year and increasing stepwise by year up to 10 years are assumed, with operating period of 2 years, to which the following rules are to be applied:

(i) Interest rate swap of 2 years and over: To be cancelled 2 years later.

(ii) Interest rate swap of 1 year: After an elapse of 1 year, extra fund is rolled with LIBOR (London Inter-bank Offered Rate) (rollover).

If the time of cancellation of a swap is every 3 months, an interest rate swap of 2 years (=24 months) and over may be fragmented respectively into 8 kinds of swaps, and an interest rate swap of 1 year (=12 months) may be fragmented into 4 kinds of swaps. For the time of initiation of swap, similar timing may be assumed. Further, since a swap has two phases of fixed rate receiving and fixed rate paying, when an investment period is 2 years, the kinds of interest rate swaps for which an investment may be made will be fragmented into 668 ways as indicated below:

1 year swap (4+3+2+1)×2=20
2 years swap (8+7+6+5+4+3+2+1)×2=72
3 years swap (8+7+6+5+4+3+2+1)×2=72
4 years swap (8+7+6+5+4+3+2+1)×2=72
5 years swap (8+7+6+5+4+3+2+1)×2=72
6 years swap (8+7+6+5+4+3+2+1)×2=72
7 years swap (8+7+6+5+4+3+2+1)×2=72
8 years swap (8+7+6+5+4+3+2+1)×2=72
10 years swap (8+7+6+5+4+3+2+1)×2=72

Thus, 20+72+72+72+72+72+72+72+72=668 ways are obtained.

<Step 1: Setting a Scenario>

(A) Basic Scenario:

How the configuration of interest curve will be changed after an elapse of an operating period is set up.

Both ends of the grid point of an interest rate curve (for example, 1 month LIBOR rate and 10 years swap rate) which is to be taken in are marked as representative of a short-term interest rate and representative of a long-term interest rate respectively. When the short-term interest rate is assumed to have a possibility of 3 different ways of fluctuation of constant (no fluctuation), downfall, advance (ascending), and the long-term interest rate has three (3) possible ways of fluctuation of constant (no fluctuation), downfall, advance (ascending), the fluctuation patterns of both short-term and long-term interest rates will have 3×3=9 ways of fluctuation patterns. A basic scenario is constituted based on such 9 ways of fluctuation. The width of advance and down fall of the interest rate may be set at two (2) times of the historical volatility, which is normally sufficient.

Figure 3:
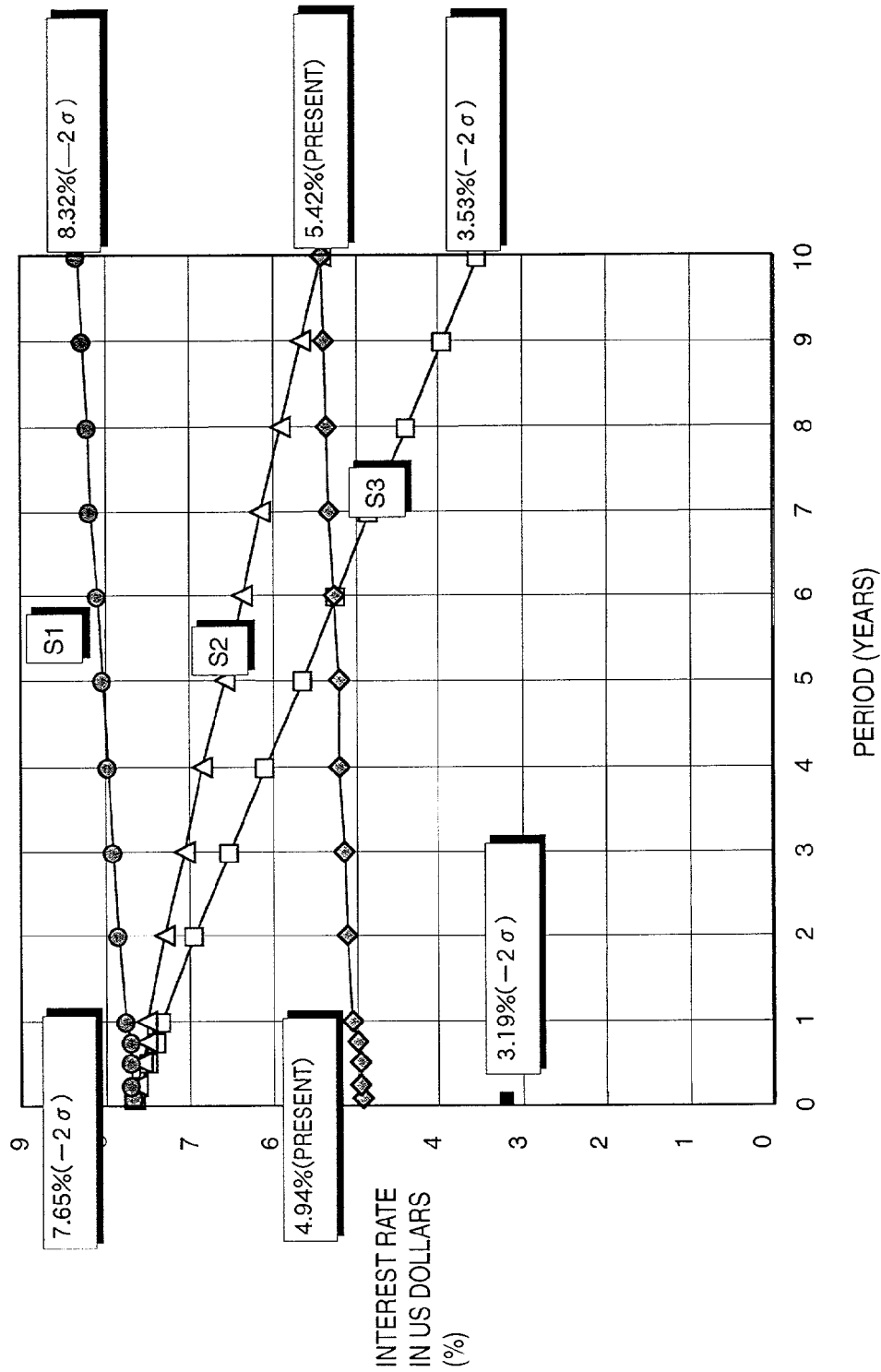
FIG. 3 is a diagram to explain an example of the basic scenarios of the embodiment.
Figure 4:
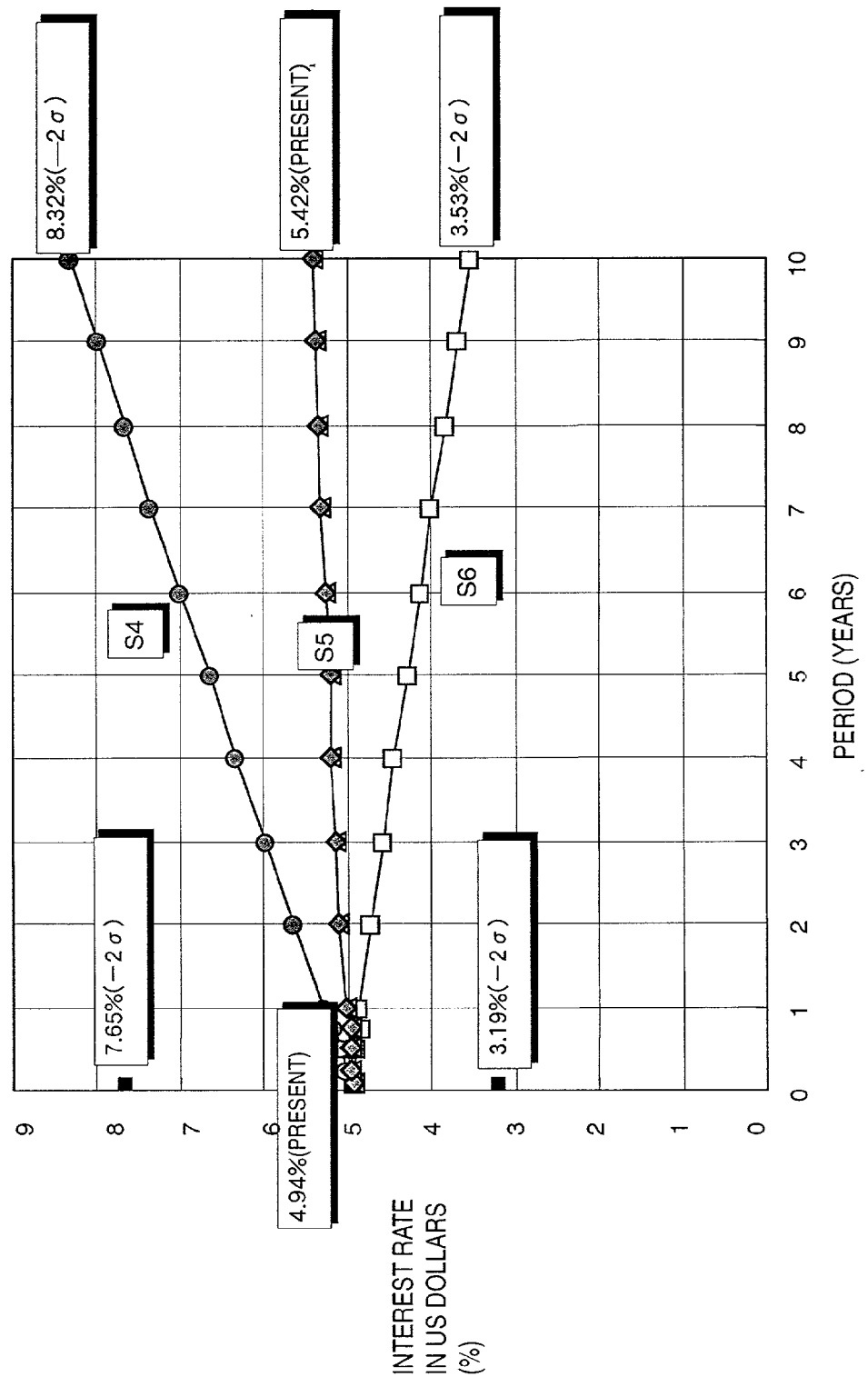
FIG. 4 is a diagram to explain an example of the basic scenarios of the embodiment.

FIGS. 3 to 5 show examples of basic scenarios, that is examples of operation with U.S. dollars with an operating period of 2 years. The scenarios shown in these drawings are labelled as Scenario 1 (S1) to Scenario 9 (S9).

The fluctuation among each grid point between 1 month LIBOR rate and 10 years swap rate is obtained as follows.

When the width of variation in the 1 month LIBOR rate is expressed by $\Delta_{1M}$, the width of variation in the 10 years swap rate is expressed by $\Delta_{10Y}$, the volatility of the 1 month LIBOR rate in the nearest 1 year period is expressed by $\sigma_{1M}$, the volatility of the 10 years swap rate in the nearest 1 year period is expressed by $\sigma_{10Y}$, the swap rate at present of x year is expressed by $R_x$, and the operating period is expressed by T, a swap rate of x years after an elapse of T years from present, $R_x^T$, is given by the following equation, where S in the equations shown below will be normally S=2:

$$R_x^T = \sigma_x \cdot \Delta_{1M}^{(S)} + (1-\sigma_x) \cdot \Delta_{10Y}^{(S)} + R_x \quad [EQ3]$$

provided, $$\rho_x = \frac{10-x}{10-1/12} \quad [EQ\ 4A]$$

$$\Delta_{1M}^{(S)} = \quad [EQ\ 4B]$$
$$\{\exp(+s \cdot \sigma_{1M} \cdot T^{1/2}), \exp(0), \exp(-s \cdot \sigma_{1M} \cdot T^{1/2})\} \cdot R_{1M} - R_{1M}$$

$$\Delta_{10Y}^{(S)} = \quad [EQ\ 4C]$$
$$\{\exp(+s \cdot \sigma_{10Y} \cdot T^{1/2}), \exp(0), \exp(-s \cdot \sigma_{10Y} \cdot T^{1/2})\} \cdot R_{10Y} - R_{10Y}$$

(B) Interest Rate Path/Scenario:

When the operating period is expressed by T, the swap rate of x years at the time when the operation is started is expressed by $R_x^0$, the swap rate of x years after an elapse of T years from present is expressed by $R_x^T$, a swap rate of x year after an elapse of t years ($0 \leq t \leq T$), $R_x^t$ is given by the following equation:

$$R_x^t = (R_x^T - R_x^0) \cdot \left(\frac{t}{T}\right)^v + R_x^0 \quad [EQ\ 5]$$

Here, v represents a parameter to define a path configuration, and 3 different ways of scenarios as V=0.2, or V=1, or V=5 are set.

In FIGS. 6 and 7, 1 month LIBOR of U.S. dollars is taken up as an example. FIG. 6 shows a case when the interest rate ascends in the basic scenario, and FIG. 7 shows a variation process of interest rate when the interest rate descends.

Thus, an interest rate fluctuation scenario will give, when the basic scenarios have p different ways and the interest rate scenarios have q different ways, a total of p×q ways, and in the examples of FIGS. 3 to 7, 9×3=27 different ways are given.

The above mentioned fluctuation scenarios are generated beforehand and are memorized in the data base.

<Step 2: Determination of a Portfolio to Maximize the Expected Earnings>

This Step 2 is to obtain such portfolio as maximizing the expected earnings against each scenario. A portfolio having such expected value as being at a certain level or higher and at the same time being at as much larger level as possible is obtained by a linear programming method.

As a concrete measure, for a purpose of effecting a control over the expectable profit and loss profile of a portfolio, (1) a constraint set using function (duration, etc,) which takes the market prices as variable, and (2) a constraint set for effecting control over the profit and loss that can be earned/sustained are defined beforehand, and the linear programming problem mentioned below is solved, following the application rules which have been set beforehand against each swap fragmented as mentioned above, relative to such portfolios as comprising only the swaps which satisfy a subset of the constraint sets mentioned above.

That is, a linear programming problem to maximize the objective function [EQ14] under the constraint of [EQ6] through [EQ13], relative to all scenarios, k=1, . . . , K.

$$\sum_{i=1}^{N} P_i^{(t,1)} \cdot X_i > \alpha_{(t,1)} \quad [EQ\ 6]$$

...

$$\sum_{i=1}^{N} P_i^{(t,k)} \cdot X_i > \alpha_{(t,k)} \quad [EQ\ 7]$$

...

$$\sum_{i=1}^{N} P_i^{(t,k)} \cdot X_i > \alpha_{(t,k)} \quad [EQ\ 8]$$

...

-continued $$\sum_{i=1}^{N} d_i(t) \cdot X_i < d(t) \quad [EQ\ 9]$$

...

$$\sum_{i=1}^{N} d_i(t) \cdot X_i < d'(t) \quad [EQ\ 10]$$

...

$$\sum_{i=1}^{N} X_i > \varepsilon \quad [EQ\ 11]$$

...

$$\sum_{i=1}^{N} X_i \cdot \delta(i) < M \quad [EQ\ 12]$$

...

$$\sum_{i=1}^{N} X_i \cdot \delta(i+1) < M \quad [EQ\ 13]$$

...

$$\sum_{i=1}^{N} P_i^{(T,K)} \cdot X_i \quad [EQ\ 14]$$

where,
k: scenarios (=1, . . . , K)
i: fragmented swap (=1, . . . , N)
T: operating period
t: Relative time from initiation of operation ($0 < t \leq T$)
$P_i^{(t,k)}$: Expected earnings rate of the fragmented swap i at the time t relative to the scenario k
$\alpha_{(t,k)}$: positive constant
$x_i$: holding ratio relative to fragmented swap, i
$d_i(t)$: the duration at the time t relative to fragmented swap, i, and when t expresses a time which is earlier than the time of start of the swap, i: $d_i(t)=0$
d(t), d'(t): positive constants
$\delta(i)$: $\delta(i)=1$ when i is an odd number, $\delta(i)=0$ when i is an even number
ω: small positive constant
M: positive constant.

Here, when it was revealed that there is no solution in the middle of computation, the expected value, $\mu_k$ $$\mu_K = \sum_{i=1}^{N} P_i^{(T,K)} \cdot X_i^{(k)} \quad (k = 1, \ldots, K) \quad [EQ\ 15]$$

is obtained by recursively conducting the procedure of reducing the value of the constant $\alpha_{(t,k)}$ to somewhat smaller value and starting all over again from the beginning.

Here, this restraint is generated beforehand and memorized in the data base.

<Step 3: Variance-covariance Matrix of the Optimum Portfolio>

This Step 3 is to obtain the variance-covariance matrix relative to the optimum portfolio for each scenario. Sample paths are made to be generated using the past data of the market which is supposed to be subject to a normal distribution of multiple-variate, then the average, variance, correlation coefficient for every one of the fragmented asset universe are obtained, then the variance-covariance matrix V (square matrix of K-th dimension) for the optimum portfolio for the total K different ways of scenarios are obtained by using the average, variance, correlation coefficient mentioned above, according to the optimum portfolio for each scenario obtained in the Step 2.

<Step 4: Efficient Frontier>

Step 4 is to obtain efficient frontier with the optimum portfolios for every one of scenarios used as its asset universe. A target expectation, $\mu_h$, is set at a constant c+1 different ways as shown below:

$$\mu_h = h \cdot \frac{(\mu^{max} - \mu^{min})}{c} + \mu^{min} \quad (h = 0, 1, \ldots, c) \quad [EQ\ 16]$$

where, $\mu^{max} = \max_k \mu_k$ $\mu^{min} = \min_k \mu_k$ [EQ17]

then, against such data as mentioned, portfolio vector, y, of K-th dimension which minimizes the following Lagrangian function, L (y), that is efficient frontier is obtained by using quadratic programming method:]

$$L(y) = \quad [EQ\ 18]$$

$$y'Vy - \lambda_1(1'y - 1) - \lambda_2(m'y - \mu_h) - \sum_{j=3}^{J} \{f_j(y) - g_j(y, a_j)\}$$

Here, V expresses variance-covariance matrix at the optimum portfolio relative to each scenario obtained in the Step 3; m' represents a vector expressed by m'=($\mu_1$, . . . , $\mu_k$, . . . , $\mu_K$); 1 represents K-th dimensio all consisting of 1; $\lambda_1$, $\lambda_2$, $\lambda_j$ (j=3, . . . , J) represent Lagrangian multiplier relative to J pieces of constraints; $f_j$, $g_j$ represent function to determine j-th constraint; and $a_j$ represents constant vector.

<Mode of Display>

For displaying the information obtained by applying the portfolio optimization method mentioned above for customers, a time table of portfolios during the operating period is displayed by a position table in FIG. 8.

Figure 9:
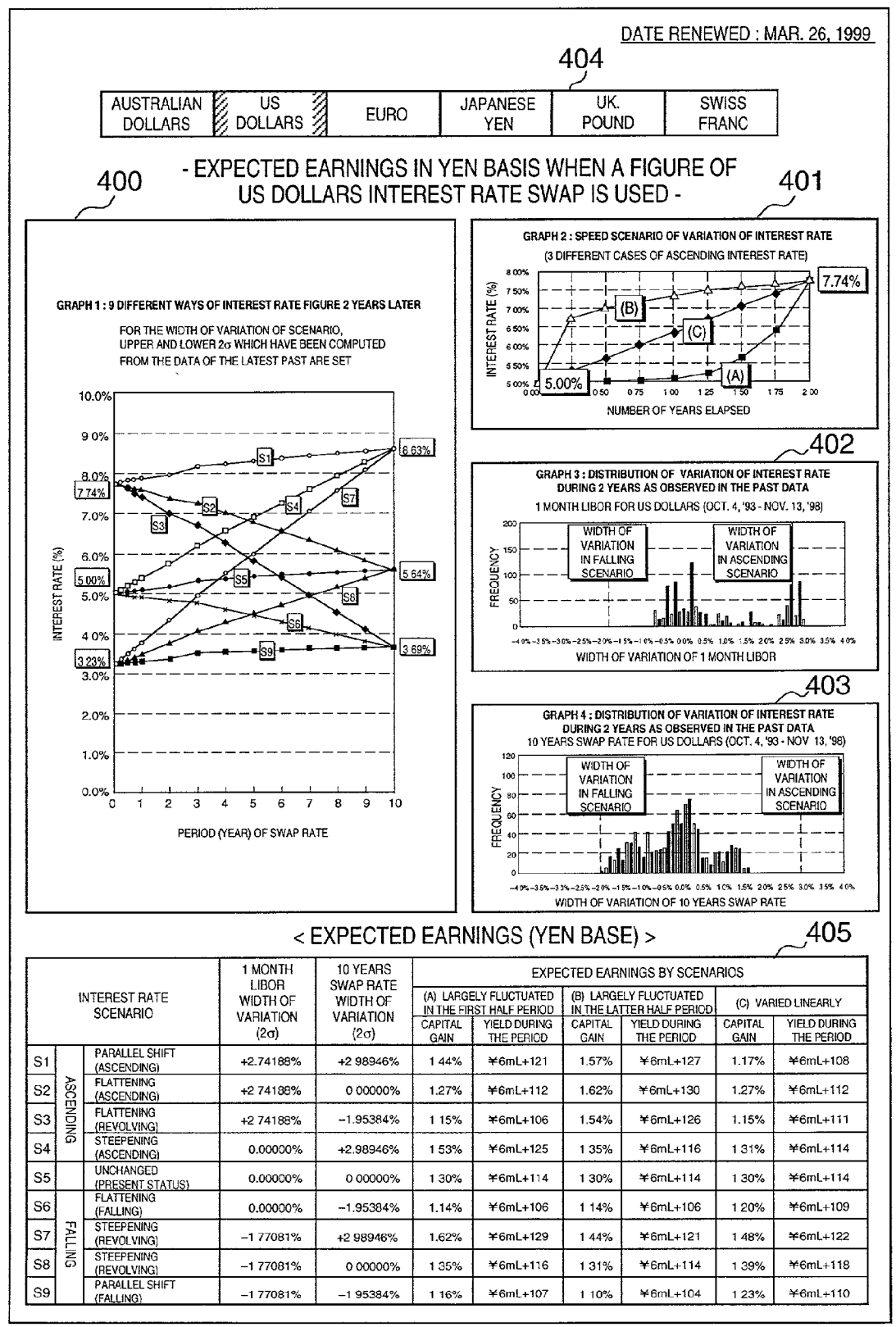
FIG. 9 is the diagram showing an example of indications of various information obtained by an optimization of portfolio.
Figure 11:
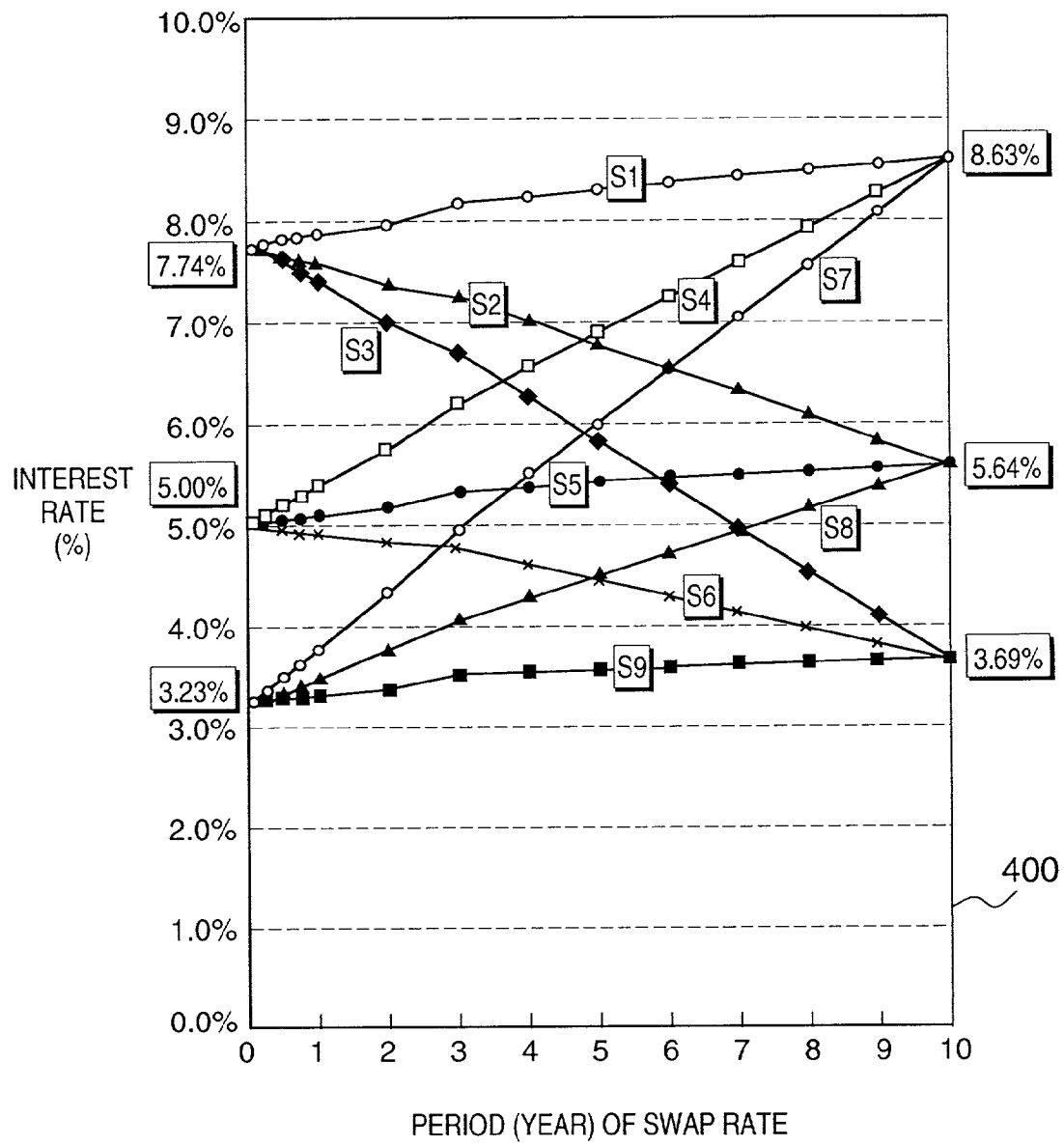
FIG. 11 is a diagram to show indication examples of 9 different ways of basic scenarios.

A display is made in a display device relating to what expected earnings of the total fund can be expected under what price fluctuation scenario, when a fund is established by applying the above mentioned portfolio optimization method. As a display mode for such display, it is made as an example as shown in FIG. 9, if a size of an image plane of the display device permits. In FIG. 9, what is shown as 404 is a display of a dialogue to designate what country the interest rate swap is to pass for obtaining an expected earnings in yen basis. Details of this dialogue is shown in FIG. 10. In the example of FIG. 10, it is displayed that an interest rate swap quoted in U.S. dollars should be used. FIG. 11 is a partial enlargement of 400 in FIG. 9. and this 400 is a display area indicating the basic scenario of figure variation of interest rate of 2 years later. In this example, 9 different ways of the basic scenarios are displayed.

Figure 12:
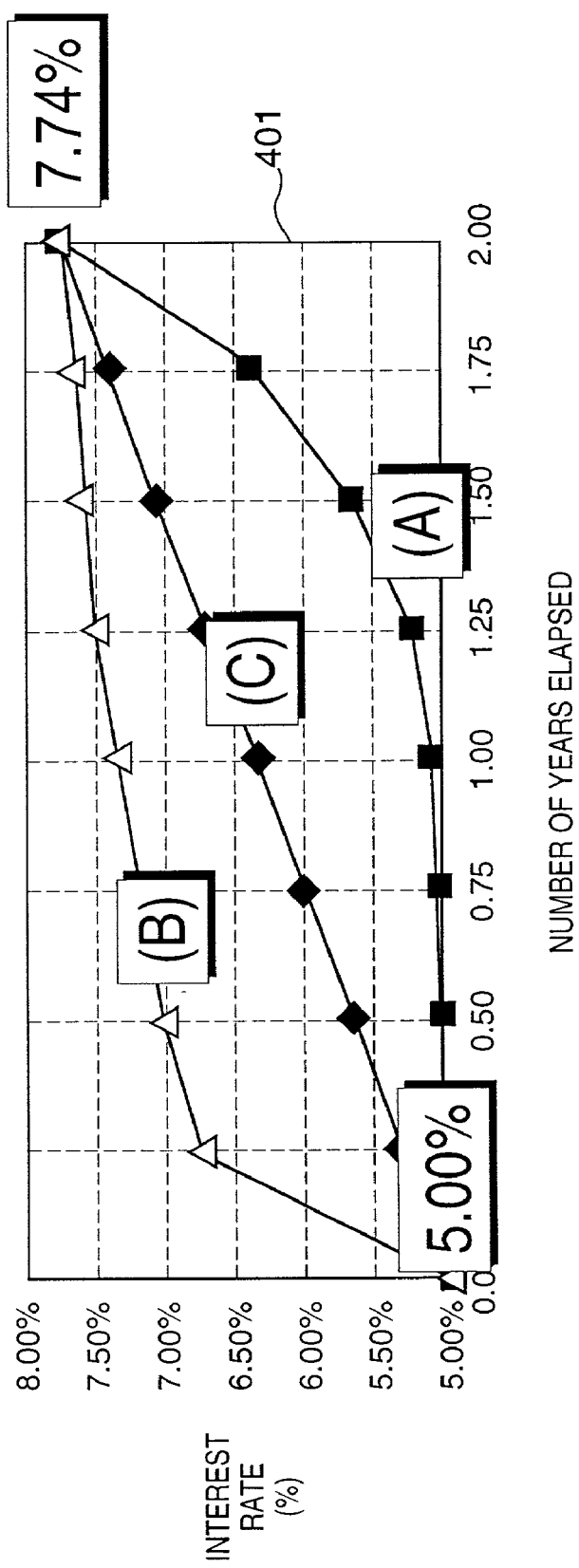
FIG. 12 is a diagram to explain an example of speed scenarios of interest rate fluctuation.
Figure 13:
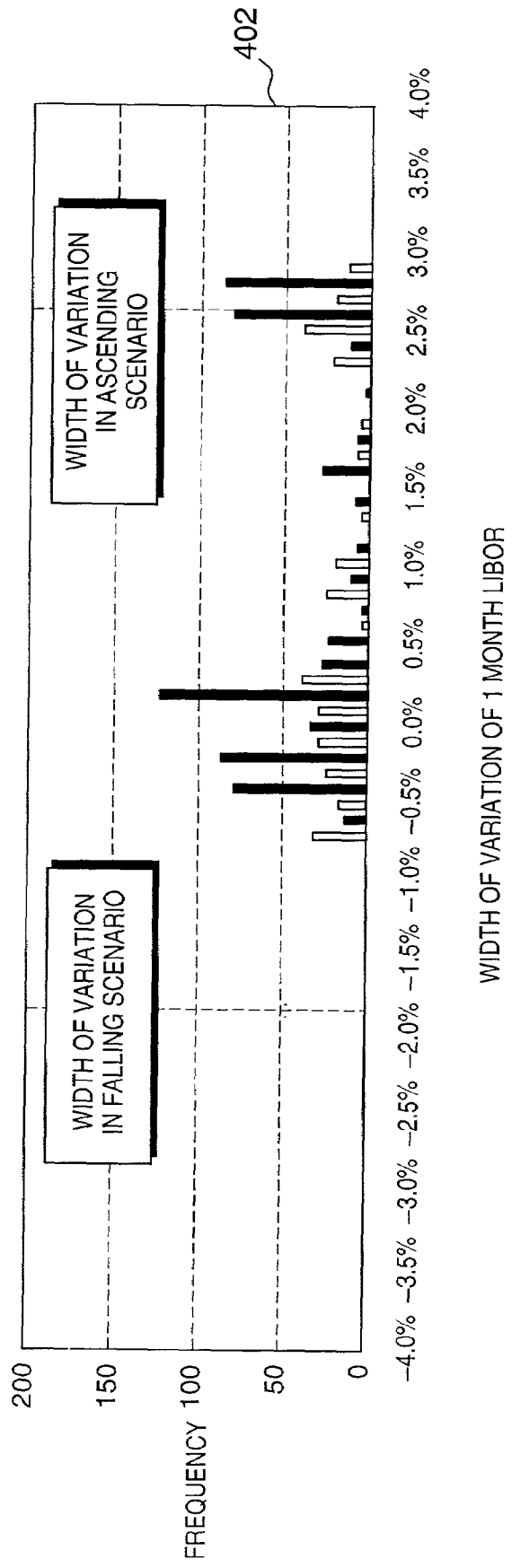
FIG. 13 is a diagram to explain an example of frequency distribution of interest rate fluctuation.
Figure 16:
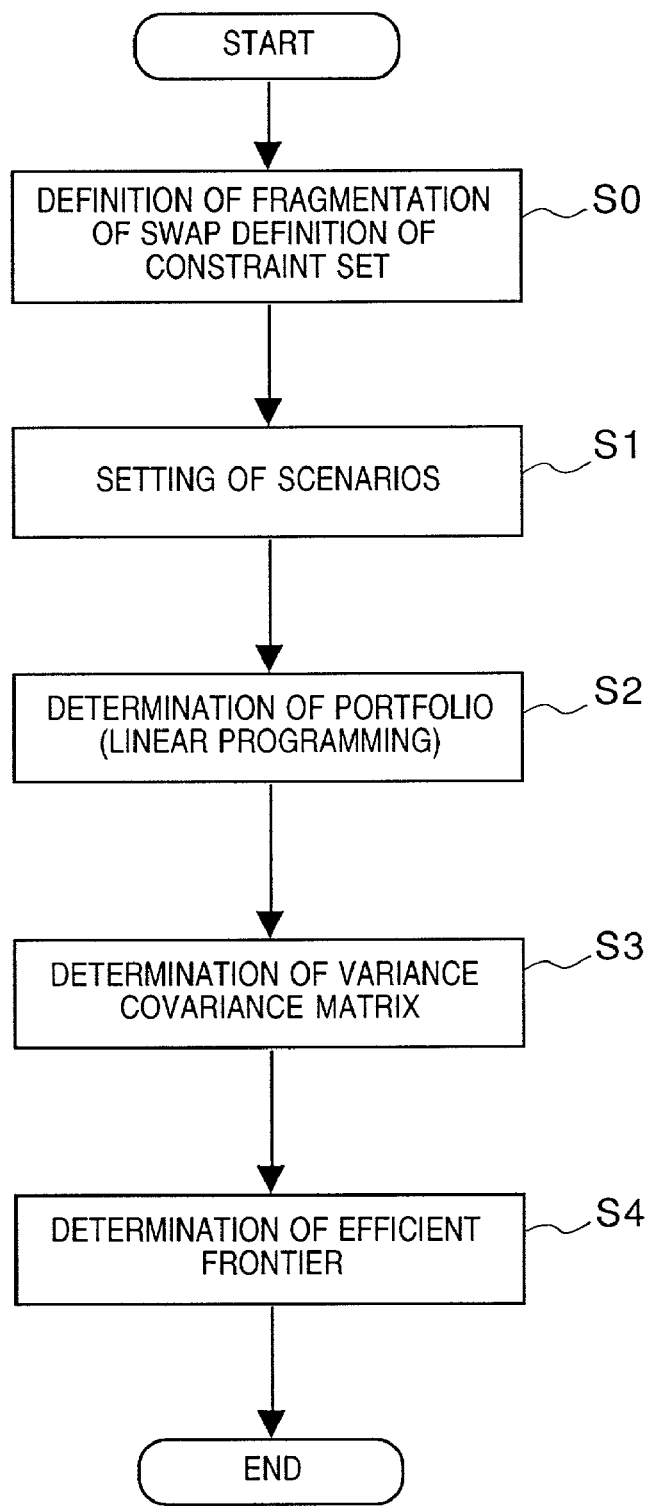
FIG. 16 is flow chart to show processing sequence in the embodiment.

Also, FIG. 12 is a display area to indicate example of interest rate paths, and corresponds to the display area 401 of FIG. 9. As mentioned above, since this embodiment configuration is setting 3 different ways of scenarios of v=0.2, or v=1, or v=5 against the interest rate path scenario as shown in the equation [EQ], 3 different ways of scenarios are displayed in FIG. 12. Also, FIG. 13 is an enlarged view of the display area 402 of FIG. 9, and this area 402 shows in a graph a fluctuation of interest rate of 1 month LIBOR for the data of the past 2 years. Similarly. FIG. 14 shows an enlarged view of the display area 403 in FIG. 9, and this area 403 shows in a graph a fluctuation of 10 years swap rate for the data of the past 2 years.

FIG. 15 shows simulation results of expected earnings relative to 9 different scenarios of S1 through S9 (field 501). Field 502 contains expressions indicating approximate figure of each scenario, 503 indicates a width of variation (2σ) of 1 month LIBOR, 504 indicates a width of variation (2σ) of 10 years swap, then 505 through 510 show earnings (capital gain) and yield in the period by scenarios.

Second Example

The First Example mentioned above permits a simulation to be made directly at an outside. Second Example is convenient for a case where a plurality of fund operators jointly own a fund operating system through one network (provided that the security of each operator is secured). But, actually for customers who are purchasers of fund, much of information provided by the above mentioned First Example is unnecessary. That is because a simulation requires complicated handling, of which many of such handling are not necessary for purchasers of fund. In view of this, the First Example may be so modified as providing FIG. 9 only to customers and not providing FIG. 8 (position table). The reason therefor is that from a standpoint of actual fund operators, a position table as final results of simulation is important, being different from a standpoint of a developer of a fund operating system who regards algorithm of simulation important. That is because, if a position table containing future buying and selling is leaked outside (particularly to market participants), competitors will find out with confidence specific positions to be taken by our side.

Therefore, the Second Example makes such customizing as changing various parameters in simulation depending on desire of a customer, but the simulation itself is done limitedly by the insiders (operator of fund).

However, not providing a position table at all time could negate a trust in the effectiveness of this system. Therefore, a system is proposed in the Second Example, that although a providing of a position table is prohibited in principle, a position table is provided to a fund purchaser (that is to outside) only in a special case, provided that an authentication of the fund purchaser is made as much as possible. Such special case involves:

a: Before a Contract is Initiated

A case when FIG. 8 is provided for customers to confirm the effectiveness of the present invention by preparing a position table by applying this simulation for a certain time in the past as the time for initiating an operation of fund, and a customer making computation of profit and loss based on a supposition that buying and selling are done following such position table.

b: After a Contract is Concluded

If a customer requests, positions in the past position of the operating period is provided to the customer.

In the a and b mentioned above, the authentication of the customer to whom a position table is handed over is particularly important. Therefore, the Second Example has a dialogue and protocol for authenticating such customer (although not shown in the drawings, such dialogue and protocol themselves are known publicly.) The system of the Second Example further contains a dialogue to introduce a time of the above mentioned past time and duration.

The Second Example having such dialogue can secure understanding of a customer as a fund purchaser of the usefulness of this system surely and at the same time efficiently.

As has been explained above, the present invention makes it easy to optimize a portfolio in which the probability of obtaining excess earnings is enhanced.

As many apparently widely different embodiments of the present invention can be made without departing from the spirit and scope thereof, it is to be understood that the invention is not limited to the specific embodiments thereof except as defined in the appended claims.

What is claimed is:

1. A method executed by a computer system having a database, of providing an optimum portfolio by combining a plurality of financial instruments to make portfolios and evaluating the made portfolios for a predetermined period of investment, said method comprising:

a preparing step of fragmenting financial instruments based on kinds of financial instruments, buying or selling, time of concluding contract, and time of canceling contract within the predetermined period of investment to create fragmented financial instruments, preparing an initial set of portfolios by combining the fragmented financial instruments as asset universe, and storing the initial set of portfolios into the database;

a generating step of generating a plurality of fluctuation scenarios of market prices related to the financial instruments during the predetermined period of investment and storing the plurality of generated fluctuation scenarios into the database, wherein the plurality of fluctuation scenarios are made from actual data of market price fluctuation so as to substantially cover an actual space of market price fluctuation during the predetermined period of investment including downfall fluctuation scenarios, said plurality of fluctuation scenarios being at least 27 different scenarios which are included within a possible space of market price fluctuation formed between a change width of short-term interest rate and a change width of long-term interest rate and have a plurality of different path configurations each representing a change from short-term interest rate to long-term interest rate, said widths being determined so that both advance and downfall possibilities of interest rate are set at two times of a historical volatility of interest rate;

a simulation step of reducing a set of portfolios to be sought, by a) reading each of the prepared portfolios and each of the generated fluctuation scenarios out of the database repeatedly, b) making profit and loss simulations of the initial set of portfolios as changing a combination of prepared portfolio and generated fluctuation scenario under the plurality of fluctuation scenarios using a first parameter representing the fluctuation scenarios and a second parameter representing characteristics of market read out of the database to output expectation values, c) first selecting portfolios each of which has the expectation values respectively higher than predetermined values stored in the database under all of the fluctuation scenarios at every time the predetermined period from start of investment d) second selecting, among the first selected portfolios, portfolios each of which has a largest expectation value in anyone of the fluctuation scenarios, and e) storing simulation results in connection with the second selected portfolios into the database;

an optimizing step of configuring an optimum portfolio out of the reduced set of portfolios which have been selected and reduced in said simulation step, by introducing a new portfolio which incorporates the reduced set of portfolios as asset universe and minimizing a volatility of the new introduced portfolio to create the optimum portfolio, said optimum portfolio consisting of holding ratios of the fragmented financial instruments each defining a kind of financial instrument, buying or selling, time of concluding contract, and time of canceling contract within the predetermined period of investment; and a providing step of reading simulation results of second selected portfolios configuration the optimum portfolio out of the database and providing the optimum portfolio together with simulation results on all or selected ones of the plurality of fluctuation scenarios.

2. The method of providing portfolio according to claim 1, wherein the plurality of fluctuation scenarios are set beforehand taking into consideration time of buying and selling, time of concluding contract, and time of cancelling contract in the future of the financial instruments to be operated.

3. The method of providing portfolio according to claim 1, wherein in said providing step only such simulation results, that have profit and loss profiles which have a value being same as or higher than a characteristic value set beforehand, are provide.

4. The method of providing portfolio according to claim 1, wherein said providing step further comprises:

a step of setting threshold condition prescribed by a user; and a step of providing profit and loss simulation results that have such profit and loss profiles as matching the threshold condition.

5. The method of providing portfolio according to claim 1, wherein the fluctuation scenarios take into consideration such elements that will undergo price fluctuation in market, including interest rate, stock prices, commodity prices or exchange rate, etc.

6. The method of providing portfolio according to claim 1, wherein said generating step comprises a step of configuring individual fluctuation scenarios, based on past market price data;

as a plurality of basic variation scenarios which serve as the basis of the market price at a time when the operating period elapses; and as a plurality of variation process scenarios of the market prices during the operating period; and said simulation step computes profit and loss, taking a combination of plurality of basic variation scenarios and plurality of variation process scenarios, as a space of market prices in the future.

7. The method of providing portfolio according to claim 6 wherein said generating step comprises a step of giving a first constraint set using such function as taking the market prices as a variable, and a second constraint set relating to profit and loss that can be earned/sustained, both of which are constraint sets for effecting control relating to profit and loss profiles of portfolios expectable; and said simulation step applies a partial set of the first and second constraint sets respectively to each one of the fragmented operating periods.

8. The method of providing portfolio according to claim 1, wherein said simulation step applies a linear programming for obtaining such portfolio that will have a certain value or higher and at the same time can have a largest expectation in all of fluctuation scenarios.

9. The method of providing portfolio according to claim 8, wherein said generating step comprises a step of fragmenting timing of buying and selling, timing of concluding contract, timing of cancelling contract in the future of the financial instruments to be operated, by dividing the operating period with a prescribed interval according to characteristics of the financial instruments, and a step of making sample paths to be generated under a supposition of multiple variate normal distribution, using past data of market relative to variance-covariance matrix against such portfolios as corresponding to each fluctuation scenario, which is necessary for obtaining an efficient frontier, thus obtaining an average, variance, correlation coefficient of every one of the fragmented periods, then obtaining the variance-covariance matrix beforehand by using such average, variance, correlation coefficient, and memorizing the same as data base.

10. The method of providing portfolio according to claim 1, wherein said providing step displays simulation results at a prescribed display device in a manner allowing an evaluation.

11. The method of providing portfolio according to claim 1, wherein said providing step transfers simulation results to a prescribed program through a program interface.

12. The method of providing portfolio according to claim 1, wherein said providing step comprises a step of displaying at least either one of a time table of portfolios during the operating period which is established in a beginning of the period, basic scenarios, path scenarios, a histogram of a width of variation of the financial instruments assumed in scenarios and their past data, or a table of expected earnings in each scenario.

13. The method according to claim 1, wherein a program storage medium is to store or memorize computer programs which can be read by a computer, and stores or memorizes a first program code for carrying out on a computer the generating steps.

14. The method according to claim 1, wherein a program storage medium is to store or memorize computer programs which can be read by a computer, and stores or memorizes a second program code for carrying out on a computer the simulation steps.

15. The method according to claim 1, wherein a program storage medium is to store or memorize computer programs which can be read by a computer, and stores or memorizes a second program code for carrying out on a computer the simulation steps, and a third program code for carrying out on a computer the providing step.

16. The method according to claim 1, wherein a program storage medium is to store or memorize computer programs which can be read by a computer, and stores or memorizes a first program code for carrying out on a computer the generating step, a second program code for carrying out on a computer the simulation step, and a third program code for carrying out on a computer the providing step.

17. A portfolio providing device for providing an optimum portfolio by combining a plurality of financial instruments to make portfolios and evaluate the made portfolios for a predetermined period of investment, comprising:

means for fragmenting financial instruments based on kinds of financial instruments, buying or selling, time of concluding contract, and time of canceling contract within the predetermined period of investment to create fragmented financial instruments, preparing an initial set of portfolios by combining the fragmented financial instruments as asset universe, and storing the initial set of portfolios into a database;

means for generating a plurality of fluctuation scenarios of market prices related to the financial instruments during the predetermined period of investment and storing they plurality of generated fluctuation scenarios into the database, wherein the plurality of fluctuation scenarios are made from actual data of market price fluctuation so as to substantially cover an actual space of market price fluctuation during the predetermined period of investment including downfall fluctuation scenarios, said plurality of fluctuation scenarios being at least 27 different scenarios which are included within a possible space of market price fluctuation formed between a change width of short-term interest rate and a change width of long-term interest rate and have a plurality of different path configurations each representing a change from short-term interest rate to long-term interest rate, said widths being determined so that both advance and downfall possibilities of interest rate are set at two times of a historical volatility of interest rate;

means for reducing a set of portfolios to be sought, by a) reading each of the prepared portfolios and each of the generated fluctuation scenarios out of the database repeatedly, b) making profit and loss simulations of the initial set of portfolios as changing a combination of prepared portfolio and generated fluctuation scenario under the plurality of fluctuation scenarios using first parameters representing the fluctuation scenarios and second parameters representing characteristics of market read out of the database to output expectation values, c) first selecting portfolios each of which has the expectation values respectively higher than predetermined values stored in the database under all of the fluctuation scenarios at every time for the predetermined period from start of investment, and d) second selecting, among the first selected portfolios, portfolios each of which has a largest expectation value in anyone of the fluctuation scenarios, and e) storing simulation results in connection with the second selected portfolios into the database;

means for configuring an optimum portfolio out of the reduced set of portfolios which have been selected and reduced by said reducing means, by introducing a new portfolio which incorporates the reduced set of portfolios as asset universe and minimizing a volatility of the new introduced portfolio to create the optimum portfolio, said optimum portfolio consisting of holding ratios of the fragmented financial instruments each defining a kind of financial instrument, buying or selling, time of concluding contract, and time of canceling contract within the predetermined period of investment; and means for reading simulation results of second selected portfolios configuring the optimum portfolio out of the database and for providing the optimum portfolio together with simulation results on all or selected ones of the plurality of the fluctuation scenarios.

18. The portfolio providing system according to claim 17 in which a first computer device having said means for generating, and a second computer device having said means for reducing and means for providing, which are combined through a network.

19. The portfolio providing device according to claim 17, by further having means for prohibiting a position table from being provided to outside.

20. The portfolio providing device according to claim 17, by further having means for authenticating a party to whom the portfolios are provided.

21. The portfolio providing device according to claim 17 wherein said portfolio providing device further comprises means for authenticating a party to whom the portfolios are provided,
    means for prohibiting a position table from being provided to outside, and
    means for making said prohibition means inoperable when prescribed conditions are satisfied.

22. A method executed by a computer system having a database of providing an optimum portfolio by combining a plurality of financial instruments to make portfolios and evaluation the made portfolios for a predetermined period of investment, said method comprising:
    a preparing step of fragmenting financial instruments based on kinds of financial instruments, buying or selling, time of concluding contract, and time of canceling contract within the predetermined period of investment to create fragmented financial instruments, preparing an initial set of portfolios by combining the fragmented financial instruments as asset universe, and storing the initial set of portfolios into the database;
    a generating step of generating a plurality of fluctuation scenarios of market prices related to the financial instruments during the predetermined period of investment and storing the plurality of generated fluctuation scenarios into the database, wherein the plurality of fluctuation scenarios are made from actual data of market price fluctuation so as to substantially cover an actual space of market price fluctuation during the predetermined period of investment including downfall fluctuation scenarios, said plurality of fluctuation scenarios being at least 27 different scenarios which are included within a possible space of market price fluctuation formed between a change width of short-term interest rate and a change width of long-term interest rate and have a plurality of different path configurations each representing a change from short-term interest rate to long-term interest rate, said widths being determined so that both advance and downfall possibilities of interest rate are set at two times of a historical volatility of interest rate;
    a simulation step of reducing a set of portfolios to be sought, by a) reading each of the prepared portfolios and each of the generated fluctuation scenarios out of the database repeatedly, b) making profit and lost simulations of the initial set of portfolios as changing a combination of prepared portfolio and generated fluctuation scenario under the plurality of fluctuation scenarios using a first parameter representing the fluctuation scenarios and a second parameter representing characteristics of market read out of the database to output expectation values, and c) selecting portfolios each of which has the expectation values respectively higher than predetermined values stored in the database under all of the fluctuation scenarios at every time for the predetermined period from start of investment; and
    an optimizing step of configuring an optimum portfolio out of the reduced set of portfolios which have been selected and reduced in said simulation step, said optimum portfolio consisting of holding ratios of the fragmented financial instruments each defining a kind of financial instrument, buying or selling, time of concluding contract, and time of canceling contract within the predetermined period of investment.

23. The method of providing an optimum portfolio according to claim 22, wherein the fluctuation scenarios are at a short-term interest rate or a long-term interest rate.

24. The method of providing an optimum portfolio according to claim 22, wherein the fluctuation scenarios are taken into consideration a plurality of variation paths of a market price during the predetermined period of investment.

25. The method according to claim 22 wherein the method is provided on a computer-readable medium encoded with a program executed by a computer.

26. The method according to claim 25, wherein a product comprising a storage medium which computer-readably stores the program.

27. The method according to claim 23 wherein the method is provided on a computer-readable medium encoded with a program executed by a computer.

28. The method according to claim 27, wherein a product comprising a storage medium which computer-readably stores the program.

29. The method according to claim 26 wherein the method is provided on a computer-readable medium encoded with a program executed by a computer.

30. The method according to claim 29 wherein the method is provided on a computer-readable medium encoded with a program executed by a computer.

31. A portfolio providing device for providing an optimum portfolio by combining a plurality of financial instruments to make portfolios and evaluating the made portfolios for a predetermined period of investment, comprising:
    means for fragmenting financial instruments based on kinds of financial instruments, buying or selling, time of concluding contract, and time of canceling contract within the predetermined period of investment to create fragmented financial instruments, preparing an initial set of portfolios by combining the fragmented financial instruments as asset universe and storing the initial set of portfolios into a database;
    means for generating a plurality of fluctuation scenarios of market prices related to the financial instruments during the predetermined period of investment and storing the plurality of generated fluctuation scenarios into the database, wherein the plurality of fluctuation scenarios are made from actual data of market price fluctuation so as to substantially cover an actual space of market price fluctuation during the predetermined period of investment including downfall fluctuation scenarios said plurality of fluctuation scenarios being at least 27 different scenarios which are included within a possible space of market price fluctuation formed between a change width of short-term interest rate and a change width of long-term interest rate and have a plurality of different path configurations each representing a change way from short-term interest rate to long-term interest rate, said widths being determined so that both advance and downfall possibilities of interest rate are set at two times of a historical volatility of interest rate;
    means for reducing a set of portfolios to be sought, by a) reading each of he prepared portfolios and each of the generated fluctuation scenarios out of the database repeatedly, b) making profit and loss simulations of the initial set of portfolios as changing a combination of prepared portfolio and generated fluctuation scenario under the plurality of fluctuation scenarios using a first parameter representing the fluctuation scenarios and a second parameter representing characteristics of market read out of the database to output expectation values, and c) selecting portfolios each of which has the expectation values respectively higher than predetermined values under all of the fluctuation scenarios at every time for the predetermined period from start of investment, and means for configuring an optimum portfolio out of the reduced set of portfolios which have been selected and reduced by said reducing means, said optimum portfolio consisting of holding ratios of the fragmented financial instruments each defining a kind of financial instrument, buying or selling, time of concluding contract, and time of canceling contract within the predetermined period of investment.

32. The portfolio providing device according to claim 31, wherein the fluctuation scenarios are at a short-term interest rate or a long-term interest rate.

33. The portfolio providing device according to claim 31, wherein the fluctuation scenarios are taken into consideration a plurality of variation paths of a market price during the predetermined period of investment.

* * * * *

UNITED STATES PATENT AND TRADEMARK OFFICE
CERTIFICATE OF CORRECTION

PATENT NO. : 7,233,921 B2
APPLICATION NO. : 09/455916
DATED : June 19, 2007
INVENTOR(S) : Shinichi Takeda et al.

It is certified that error appears in the above-identified patent and that said Letters Patent is hereby corrected as shown below:

Column 8, Line 54, delete the following equation:

$$\text{``} R_x^T = \sigma_x \cdot \Delta_{1M}^{(S)} + (1 - \sigma_X) \cdot \Delta_{10Y}^{(S)} + R_x \qquad [EQ3]\text{''}$$

And replace it with the following equation:

$$-- \ R_x^T = \rho_x \cdot \Delta_{1M}^{(S)} + (1 - \rho_x) \cdot \Delta_{10Y}^{(S)} + R_x \qquad ...[EQ3]--$$

Column 10, Line 46: change "ω: small positive constant" to -- ε: small positive constant--.

Column 11, Line 22, delete the following equation:

$$\text{``} \mu^{max} = max_k \mu_k$$
$$\mu^{min} = min_k \mu_k \qquad [EQ17]\text{''}$$

And replace it with the following equation:

$$-- \ \mu^{max} = \max_k \mu_k$$
$$\mu^{min} = \min_k \mu_k \qquad ...[EQ\ 17]--$$

Column 11, Line 41: delete "dimensio" and add -- dimension vector with their elements--.

Claim 7, Column 14, Line 59: add --,-- after "6" [should read: --6, wherein . . .--]

UNITED STATES PATENT AND TRADEMARK OFFICE
CERTIFICATE OF CORRECTION

PATENT NO.      : 7,233,921 B2
APPLICATION NO. : 09/455916
DATED           : June 19, 2007
INVENTOR(S)     : Shinichi Takeda et al.

It is certified that error appears in the above-identified patent and that said Letters Patent is hereby corrected as shown below:

Claim 29, Column 18, Line 23: change "26" to --24--.

Signed and Sealed this

Twentieth Day of November, 2007

JON W. DUDAS
*Director of the United States Patent and Trademark Office*